Dec. 9, 1952 E. J. RABENDA 2,620,878

RECORD CONTROLLED RECORDING APPARATUS

Filed Sept. 10, 1948 18 Sheets-Sheet 1

INVENTOR
EDWARD J. RABENDA
BY George D. Hicks
ATTORNEY

Dec. 9, 1952 E. J. RABENDA 2,620,878

RECORD CONTROLLED RECORDING APPARATUS

Filed Sept. 10, 1948 18 Sheets-Sheet 2

INVENTOR
EDWARD J. RABENDA
BY George D. Hicks
ATTORNEY

Dec. 9, 1952 E. J. RABENDA 2,620,878

RECORD CONTROLLED RECORDING APPARATUS

Filed Sept. 10, 1948 18 Sheets-Sheet 3

INVENTOR
EDWARD J. RABENDA
BY George D Hicks
ATTORNEY

Dec. 9, 1952 E. J. RABENDA 2,620,878

RECORD CONTROLLED RECORDING APPARATUS

Filed Sept. 10, 1948 18 Sheets-Sheet 4

INVENTOR
EDWARD J. RABENDA
BY George D. Hicks
ATTORNEY

INVENTOR
EDWARD J. REBENDA
BY George D. Hicks
ATTORNEY

Dec. 9, 1952

E. J. RABENDA 2,620,878

RECORD CONTROLLED RECORDING APPARATUS

Filed Sept. 10, 1948

18 Sheets-Sheet 6

INVENTOR
EDWARD J. RABENDA
BY George D. Nichols
ATTORNEY

INVENTOR
EDWARD J. RABENDA
BY
George D. Hicks
ATTORNEY

Dec. 9, 1952 E. J. RABENDA 2,620,878

RECORD CONTROLLED RECORDING APPARATUS

Filed Sept. 10, 1948 18 Sheets-Sheet 8

INVENTOR
EDWARD J. RABENDA
BY
George D. Hicks
ATTORNEY

INVENTOR
EDWARD J. RABENDA
BY George D Hicks
ATTORNEY

Dec. 9, 1952 E. J. RABENDA 2,620,878
RECORD CONTROLLED RECORDING APPARATUS
Filed Sept. 10, 1948 18 Sheets-Sheet 10
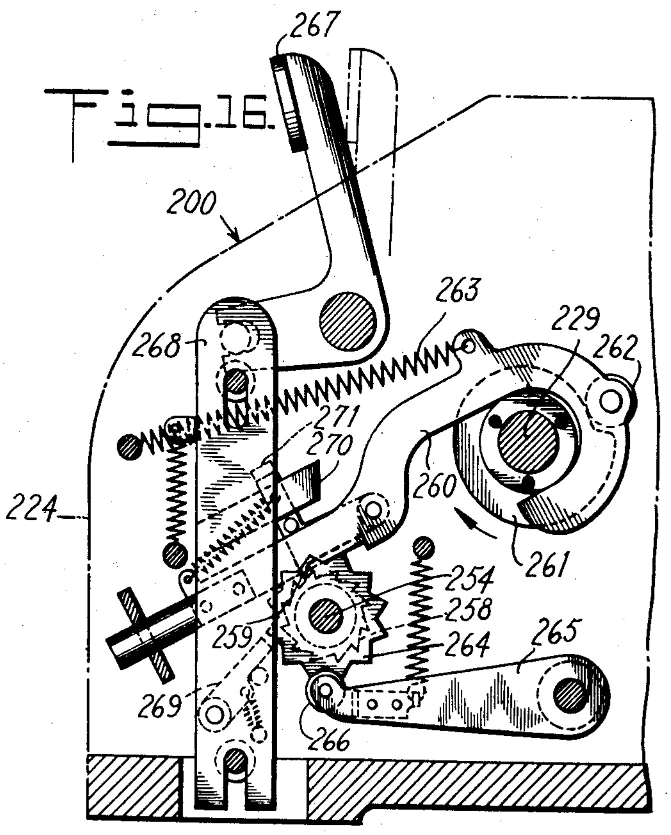
Fig. 16.
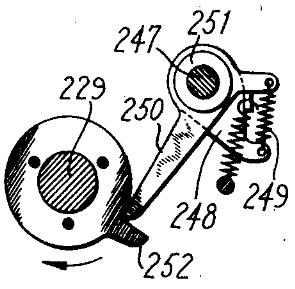
Fig. 17.
Fig. 19.
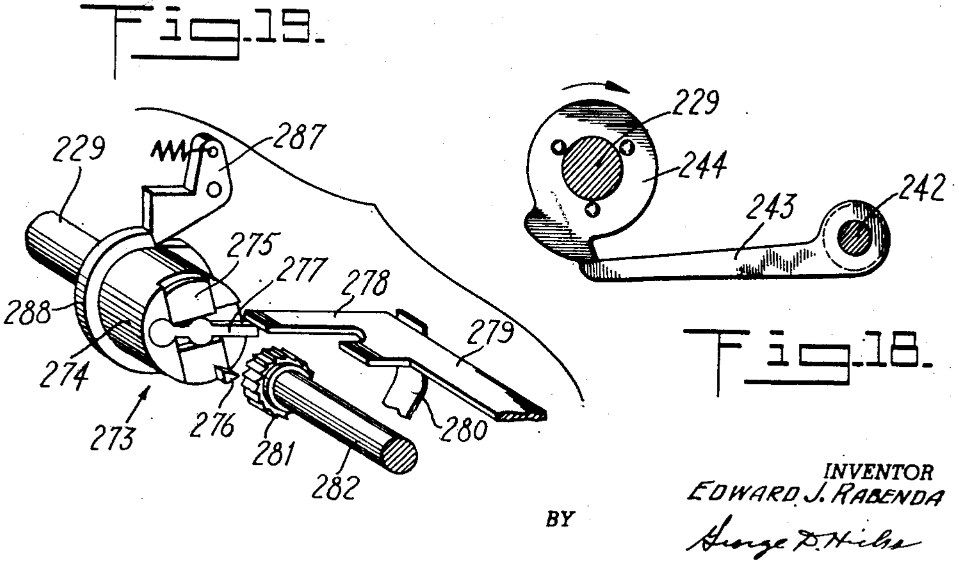
Fig. 19, Fig. 18.
INVENTOR
EDWARD J. RABENDA
BY George D. Hiles
ATTORNEY INVENTOR
EDWARD J. RABENDA
BY George D Hicks
ATTORNEY INVENTOR
EDWARD J. RABENDA
BY George D Hicks
ATTORNEY Dec. 9, 1952

E. J. RABENDA 2,620,878

RECORD CONTROLLED RECORDING APPARATUS

Filed Sept. 10, 1948

18 Sheets-Sheet 13

INVENTOR
EDWARD J. RABENDA
BY George D. Hicks
ATTORNEY

Dec. 9, 1952 E. J. RABENDA 2,620,878

RECORD CONTROLLED RECORDING APPARATUS

Filed Sept. 10, 1948 18 Sheets-Sheet 14

INVENTOR
EDWARD J. RABENDA
BY George D. Hicks
ATTORNEY

Dec. 9, 1952

E. J. RABENDA 2,620,878

RECORD CONTROLLED RECORDING APPARATUS

Filed Sept. 10, 1948

18 Sheets-Sheet 15

INVENTOR
EDWARD J. RABENDA
BY George D. Hicks
ATTORNEY

INVENTOR
EDWARD J. RABENDA
BY George D. Hicks
ATTORNEY

INVENTOR
EDWARD J. RABENDA
BY George D. Hicks
ATTORNEY

INVENTOR.
EDWARD J. RABENDA
BY
George D Hicks
ATTORNEY

Patented Dec. 9, 1952 2,620,878

UNITED STATES PATENT OFFICE 2,620,878

RECORD CONTROLLED RECORDING APPARATUS

Edward J. Rabenda, Poughkeepsie, N. Y., assignor to International Business Machines Corporation, New York, N. Y., a corporation of New York Application September 10, 1948, Serial No. 48,617

20 Claims. (Cl. 164—115)

This invention relates to data recording apparatus and it has for a broad object to provide apparatus of this type which is of improved construction and arrangement of parts.

In present-day accounting systems, it is customary to record both alphabetic and numeric data in the conventional 80-column record card according to a known 12-position code system. These record cards are used in the electric accounting machine art for a variety of purposes such, for example, as a control record source in the preparation of invoices, stock control records, salary records, etc. In certain applications, it has been found desirable for selected portions of the data contained in the record cards of one office, or location, to be recorded also in a second set of record cards for use at a second location. For a number of reasons, it is not often practical or desirable to simply reproduce the cards for use at the second location; for example, some of the data in the first set of cards may be confidential to or can be used only at the first office, and the second office may want to include in their set of record cards additional data which would be of particular use only to the second office.

According to one aspect of the present invention, apparatus is provided for storing selected portions of data from a set of record cards, in a record medium which facilitates the transmitting of such data to a different location and the manifesting of the stored data at such different location. As will appear more fully hereinafter, the preferred embodiment disclosed herein comprises a record card sensing unit which controls the operation of a tape perforating unit. In the operation of the preferred embodiment, data selected from the record cards are recorded in the tape by perforating therein code designations representing, respectively, the selected data according to a predetermined 6-position combinational hole code system. The record card sensing unit operates in step-by-step fashion to sense successively the record columns of the cards. Provision is also made to record automatically at predetermined points in the tape additional selected data-representing code designations. In the operation of the preferred embodiment, the card sensing unit performs certain functional operations, such as skipping over predetermined record columns of the card being sensed, and releasing the card being sensed and feeding a new card into sensing position. Provision is also made herein for effecting these functional operations under the control of code designations in the card or automatically at selected column reading positions of the card sensing unit, and also for selectively recording in the tape code designations in the 6-position code representing such functional operations. During the time the record card sensing unit is performing these functional operations, provision is also made for successively recording timing signals in the tape and for spacing the tape once for each such recorded timing signal. When the tape thus prepared is used to control the operation of other machines, such as recording the data in a second set of cards, or for manifesting the data in the tape in some other form, these timing signals will enable the tape-reading means of such tape-controlled machines to feed the tape idly without operating the recording means, and consequently will allow such machines time to perform the similar or corresponding functional operations while the portions of the tape containing the timing signals are being read and spaced.

It is a further object of the present invention to provide an improved form of recording apparatus which functions to record selected data in a predetermined manner and form and under the control of a record source having the data previously recorded therein in a different form.

A further object is to provide apparatus for sensing data recorded in one record medium and for reproducing the recorded data in a second record medium, and to provide apparatus of this type which may be readily and simply adjusted to operate in a variety of selected ways and which may be adjusted to record in the second record medium additional data selected from a source other than said one record medium.

A further object is to provide an improved form of card-controlled tape-perforating apparatus wherein timing perforations are automatically inserted in the tape during the period the card sensing unit is performing a functional operation.

Other objects of the invention will be pointed out in the following description and claims and illustrated in the accompanying drawings, which disclose, by way of example, the principle of the invention and the best mode, which has been contemplated, of applying that principle.

In the drawings:

Fig. 8 is an enlarged fragmentary vertical sectional view taken on the line 8—8 of Fig. 1, and illustrating a reading strip control means for automatically effecting selected control and recording operations at selected card column reading positions of the card carriage, the scale appearing above the reading strip representing the eighty different card column reading positions;

Fig. 9 shows a fragment of a record card in which is recorded all of the code designations of a selected 12-position code system used herein in explaining the operation of the preferred embodiment;

Figures 1, 3:
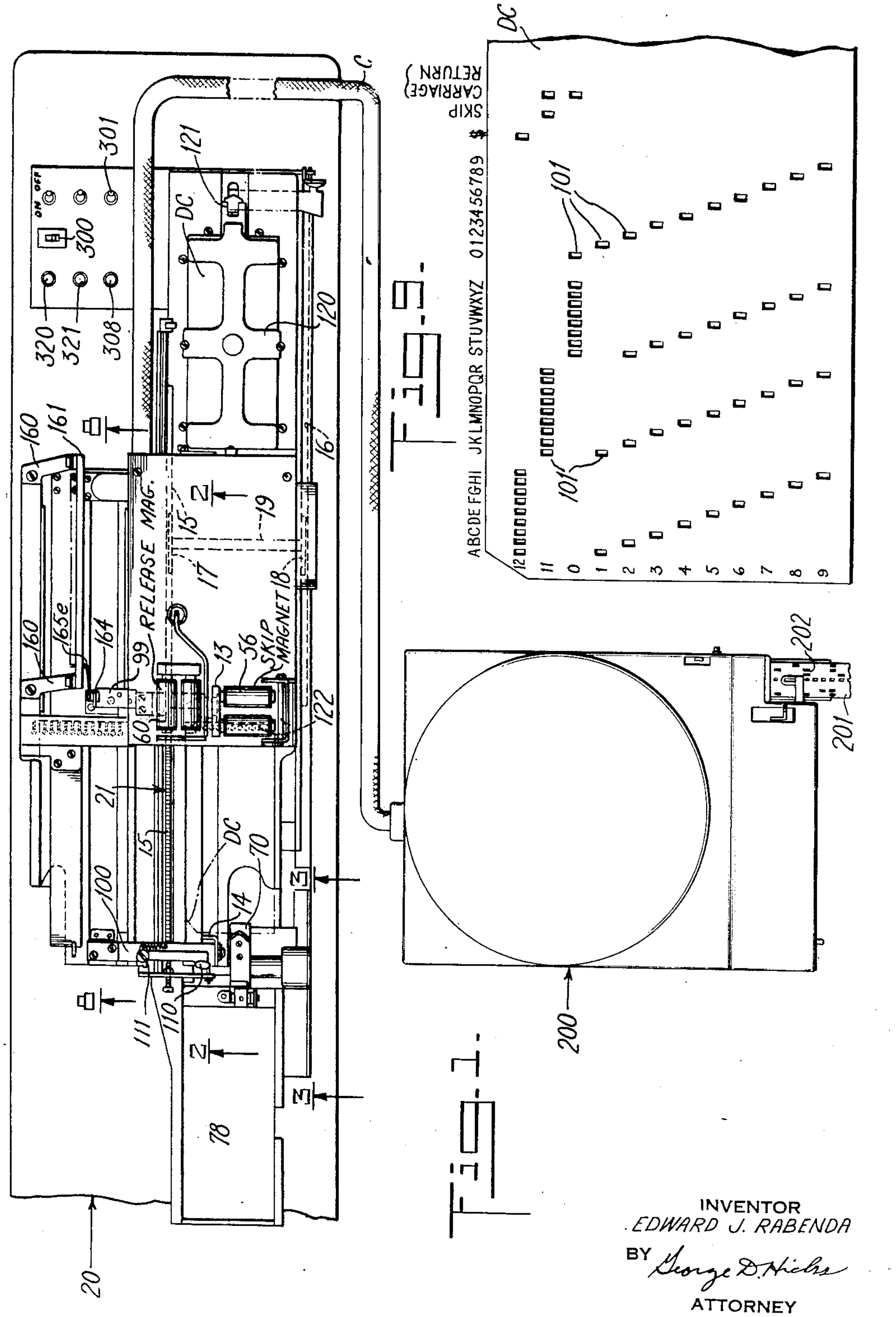
Fig. 1 is a plan view showing one preferred embodiment of data sensing and recording apparatus constructed in accordance with the present invention.
Fig. 3 is an enlarged fragmentary vertical sectional view taken on the line 3—3 of Fig. 1 and showing the record card ejecting means at the left-hand end of the record sensing unit of Fig. 1.
Figure 10:
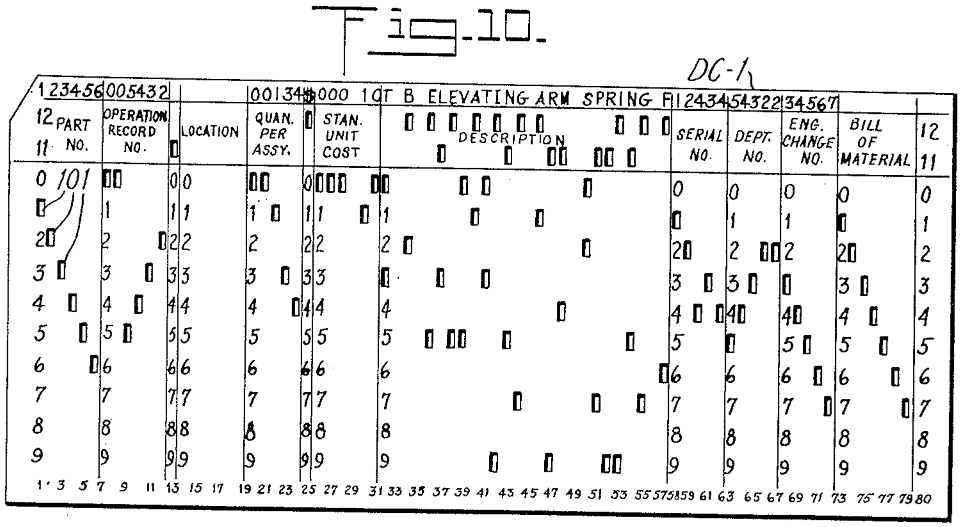
Fig. 10 shows a conventional type of record card wherein for the purpose of explaining the present invention, selected intelligence and control data have been recorded as code designations according to the 12-position code system illustrated in Fig. 9.
Figure 11:
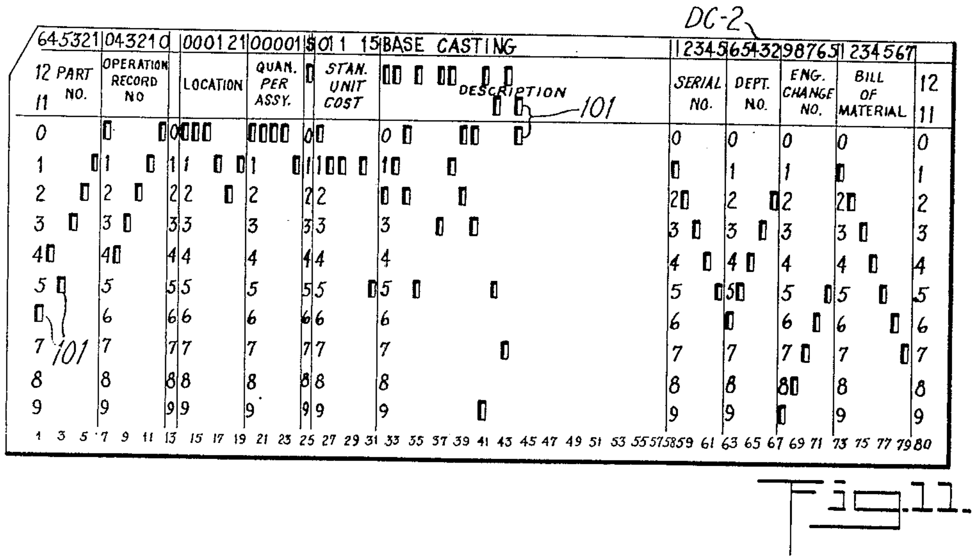
Fig. 11 shows another record card like the one of Fig. 10 and containing additional data representing code designations and used herein for explaining further the operation of the preferred embodiment.
Figure 12:
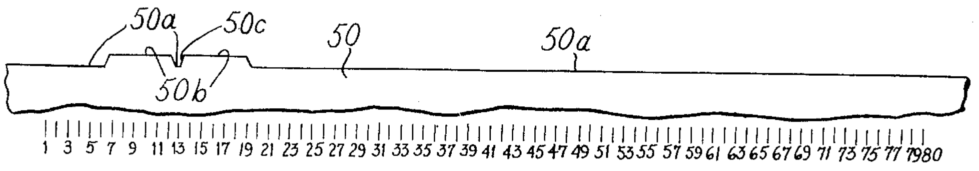
Figure 13:
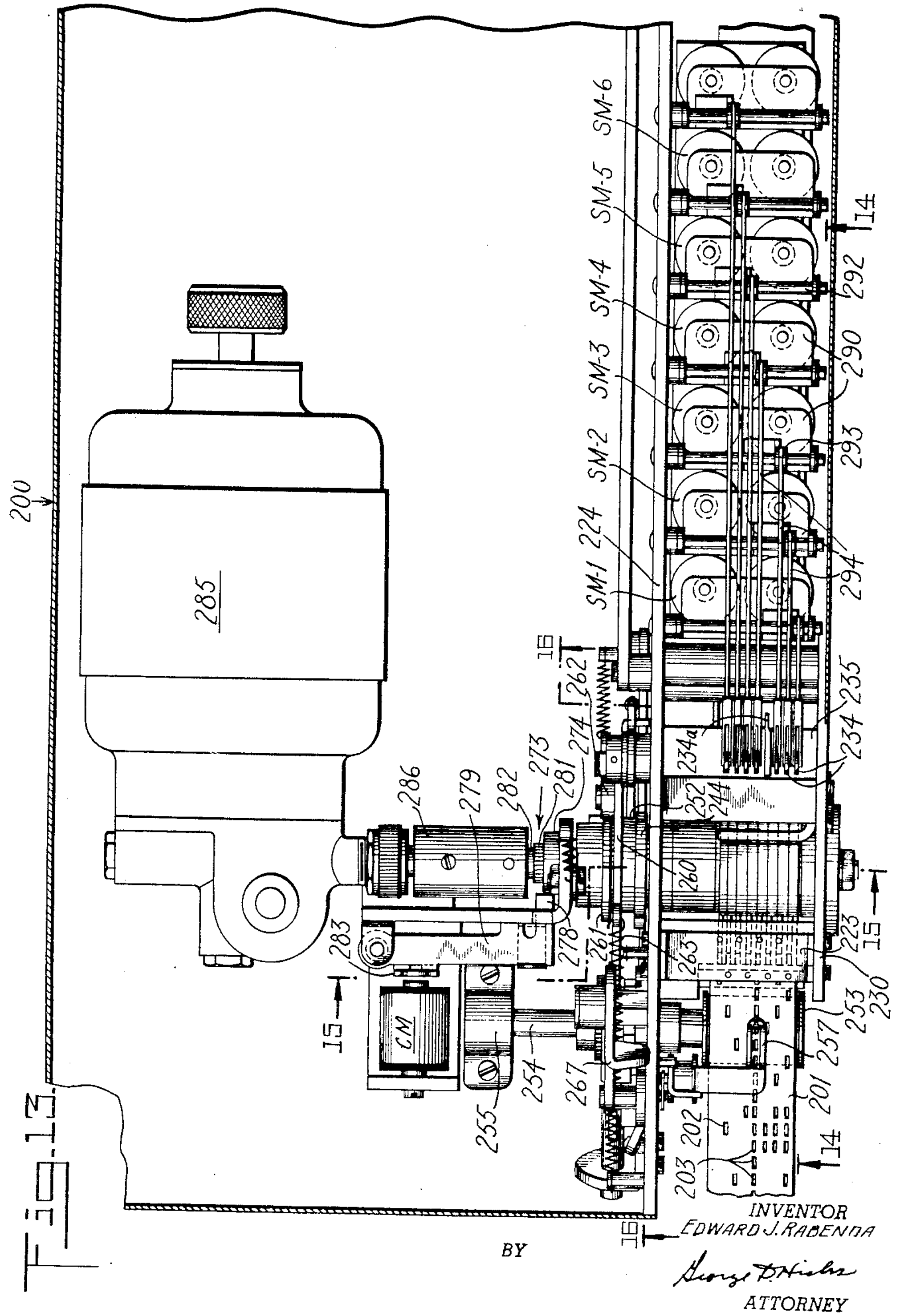
Figure 14:
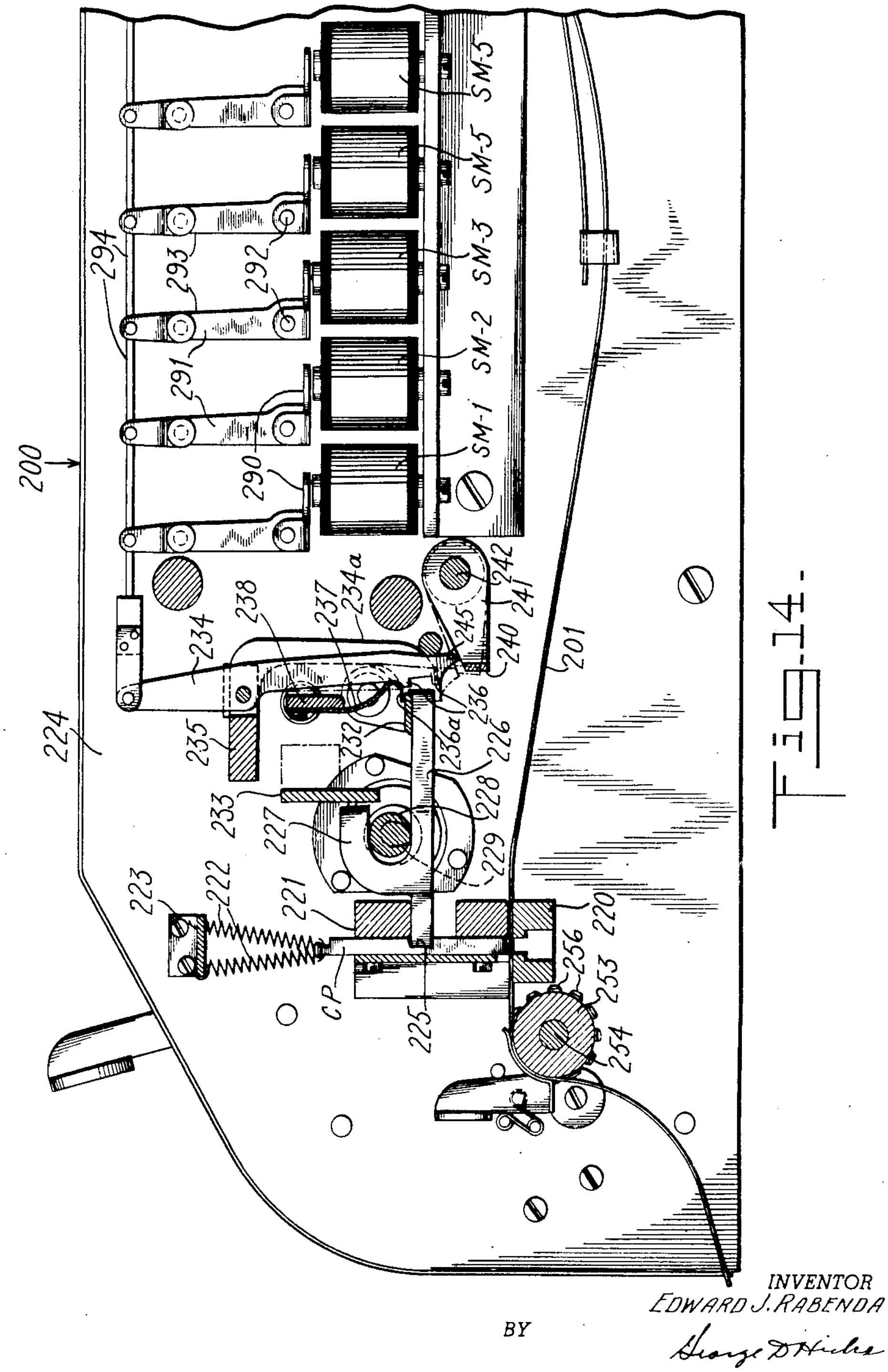
Figure 15:
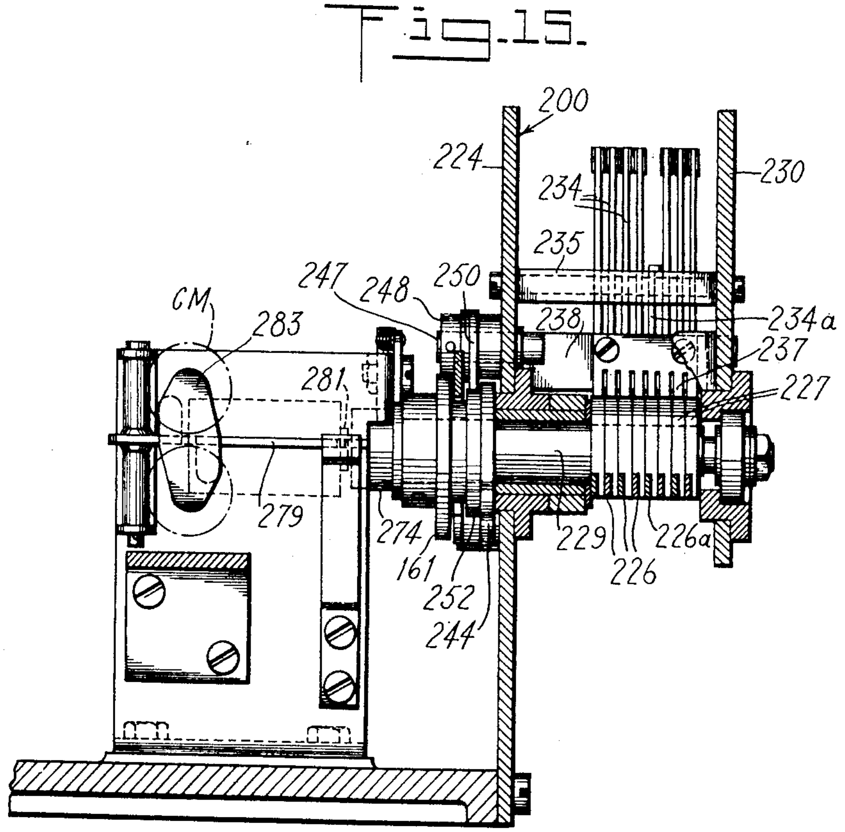
Figure 20:
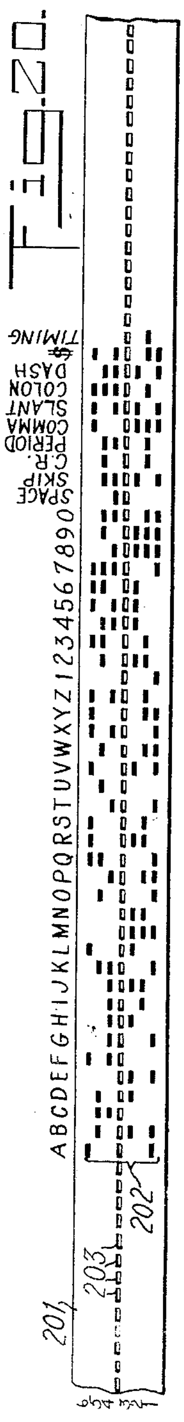
Figure 21:
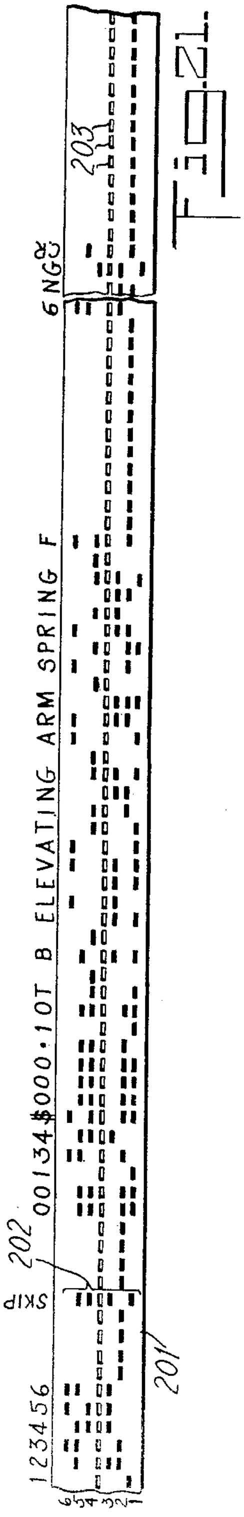
Figure 22:
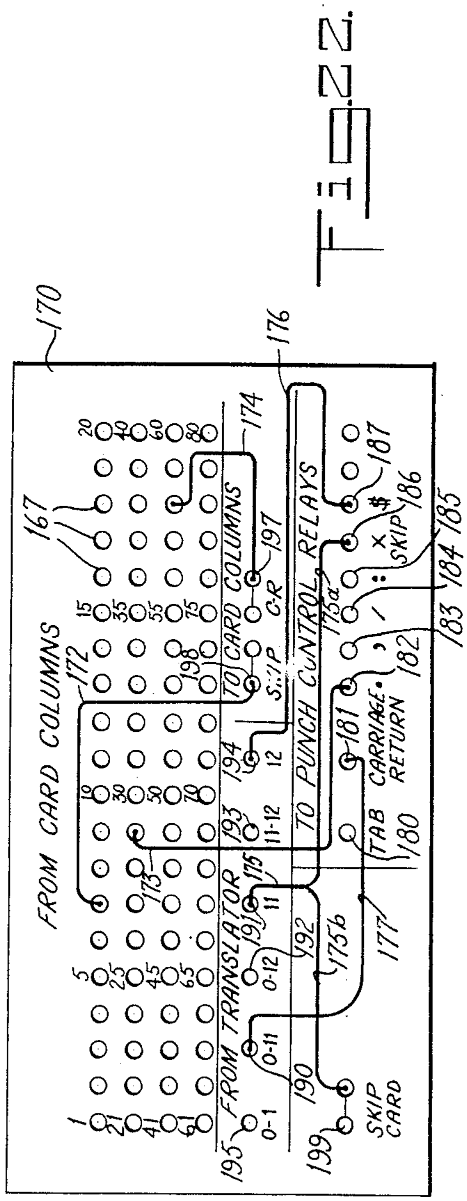
Figure 23A:
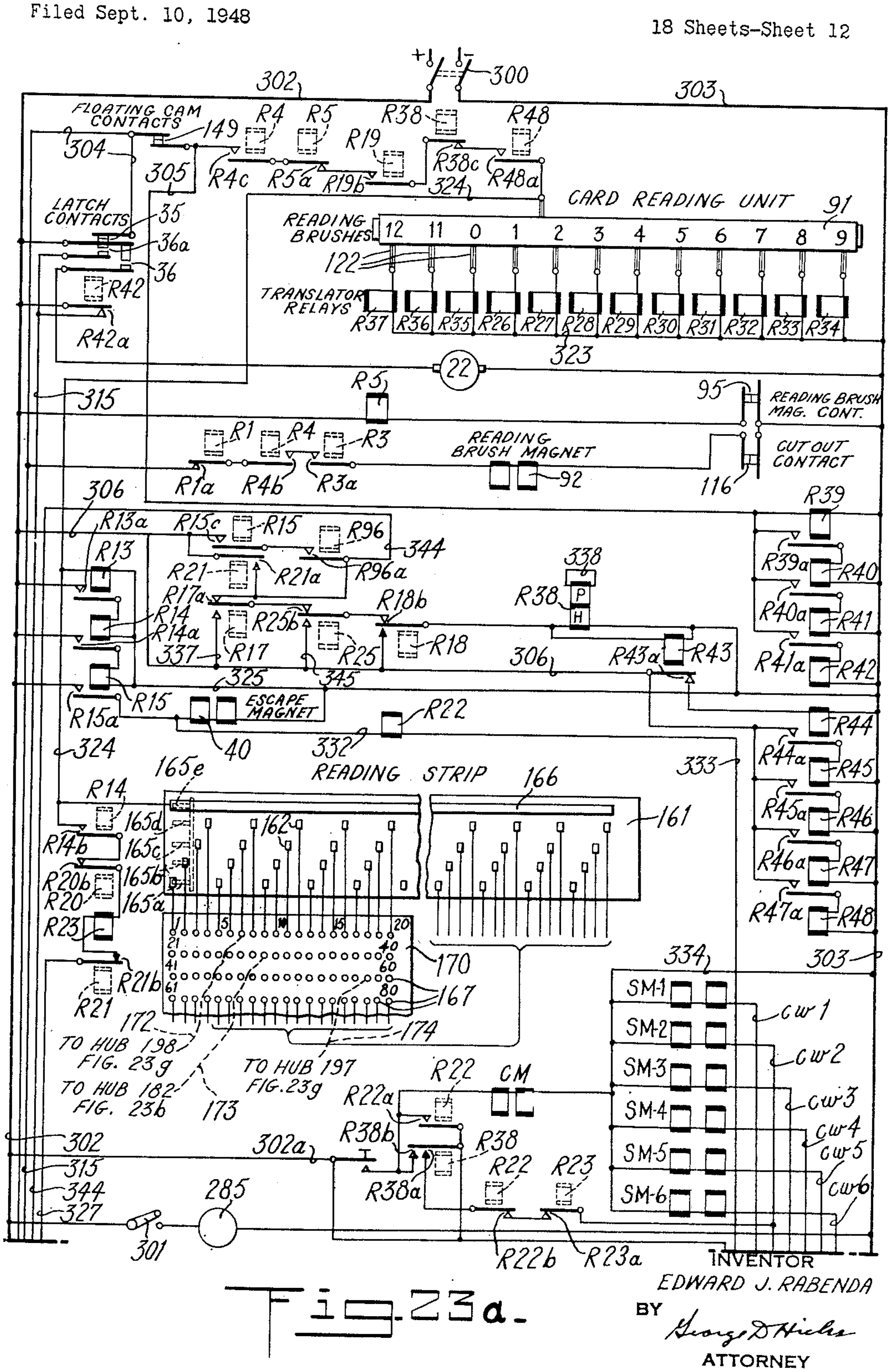

Fig. 12 shows somewhat diagrammatically a skip bar used in the record sensing unit for controlling the operation thereof, the skip bar being specially formed, or cut, to explain a selected example of operation of the record sensing unit when sensing the cards of Figs. 10 and 11, the scale appearing along the bottom of the skip bar representing the eighty column reading positions of the card carriage;

Fig. 13 is a fragmentary plan view of a record tape perforating unit forming another part of the preferred embodiment of Fig. 1, the cover of the unit being broken away to disclose the inner working parts thereof;

Fig. 14 is a fragmentary vertical sectional view of the tape perforating unit, the section being taken along the lines 14—14 of Fig. 13;

Fig. 15 is a transverse vertical sectional view taken on the lines 15—15 of Fig. 13;

Fig. 16 is a fragmentary vertical sectional view taken on the lines 16—16 of Fig. 13, and showing the feeding or spacing mechanism for the tape;

Fig. 17 is a detail view of the perforating unit and showing the cam control means for the knock-off or resetting means;

Fig. 18 is a detail view of the cam control means for the locking mechanism of the perforating unit;

Fig. 19 is an exploded view of the start-stop clutch means which also forms a part of the perforating unit;

Fig. 20 is a view illustrating a section of a record tape used with the perforating unit, such tape bearing all of the code designations of a selected 6-unit code system used herein in explaining the operation of the preferred embodiment;

Fig. 21 is a fragmentary view showing portions of a record tape bearing certain code designations in the 6-unit code system, and illustrating how the specific example of recorded data in the cards of Figs. 10 and 11 will appear when the preferred embodiment disclosed herein is operated in a predetermined manner to sense the designations in the cards and operate the perforating unit under the control thereof;

Fig. 22 is a face view of a control plugboard forming a part of the preferred embodiment and illustrating a predetermined arrangement of electrical plug connections used to control the operation of the preferred embodiment when reading the cards of Figs. 10 and 11 to produce the record tape of Fig. 21; and Figs. 23*a* to 23*g*, when arranged sequentially and in end-to-end relation with Fig. 23*a* at the top, comprise a complete wiring diagram including the various instrumentalities and circuit connections for controlling the operation of the preferred embodiment when operating under the control of the record cards of Figs. 10 and 11 and the plugboard arrangement of Fig. 22, to perforate the tape as shown in Fig. 21.

*General description*

According to the illustrative embodiment, shown generally in Fig. 1, the apparatus of the present invention comprises a record sensing unit indicated in its entirety by the numeral 20 and a tape perforating unit, indicated by the numeral 200. As will appear more fully hereinafter, the record sensing unit 20 comprises generally a magazine 120 for receiving a stack of control record cards, and a card carriage 21 for holding each record card while being sensed and operable to move the card in step-by-step fashion past a row of sensing brushes 122 so as to sense the record columns in succession, one record column being sensed for each normal operating step. The record sensing unit 20 is of the type disclosed in U. S. Patent No. 2,346,268 to Mills and Rabenda, granted April 11, 1944. The unit 200 is a tape perforator of a well-known type, it being disclosed fully in U. S. Patent No. 2,353,034 to Holt, granted July 4, 1944. The unit 200 operates under the control of the record sensing unit 20 to perforate or punch in a tape 201 code designations 202 in a 6-position code system which represent data sensed in the record card and also other data automatically recorded in a predetermined fashion. The unit 200 will be described more in detail hereinafter. An electric cable C connects the units 20 and 200 and includes circuit wires used in controlling the operation of the apparatus.

As will appear more fully hereinafter, the preferred embodiment also comprises an electric translating means which is conditioned, or adjusted, in response to the sensing of a code designation in a column of the record card, to provide an operating circuit including one of a plurality of punch control relays; the selected punch control relay effecting operation of the perforator 200 to record in the tape a code designation in the 6-position code representing the same character or functional data as is represented by the code designation in the 12-position code in the column of the record card which was sensed. Should the code designation sensed in the card represent a functional operation of the apparatus, such as a skipping or release operation of the card carriage, the translator may also provide an operating circuit including an operating control relay for effecting said functional operation. The translating means is of the electrical relay type and has not been shown in Fig. 1 because a detailed structural showing of translator relays, associated contacts, and connecting circuit wires would be of very little aid in understanding the invention. The elements of the translating means are more properly disclosed herein as a part of the composite circuit wiring diagram which is shown in Figs. 23*a* to 23*g* inclusive, and will be described generally hereinafter under a separate heading and also as a part of the description of the operation of the apparatus. In the structural embodiment of Fig. 1, the relays and connecting wires would be mounted beneath the record sensing unit 20 and be supported on the main supporting structure of the unit 20.

*Control record*

As explained hereinabove, the record source for controlling, at least in part, the operation of the preferred embodiment is in the form of an 80-column record card bearing data-representing code designations according to a predetermined 12-position code system. Such a card is partially shown in Fig. 9 with all of the code designations of the code system punched in the record columns thereof. The card is indicated by the reference character DC and the code designations by the numeral 101. Above the top of the card in Fig. 9, and in alignment with each vertical record column thereof containing a code designation 101, is positioned a legend indicating the character or functional operation represented by such designation.

Whenever a "space" operation is to occur, the card column is left blank. As will be explained hereinafter, a blank card column effects the punching of a "space" code designation in the tape, in the absence of some provision for punching a different code designation in the tape at that point.

In order to explain more clearly the operation of the preferred embodiment, two examples of record cards of the type mentioned are disclosed in Figs. 10 and 11, and are indicated by the reference characters DC–1 and DC–2, respectively. In the cards DC–1 and DC–2, certain selected data has been recorded therein in accordance with the 12-position code of Fig. 9. As shown, each of these cards contains eighty vertical record columns and the numerals extending horizontally along the bottom of the cards indicate, respectively, the location of the columns. The numerals extending in vertical rows designate, respectively, the twelve index point positions of the code system. The code designations 101 representing the various character data and the functional operations of the apparatus, comprise one or more holes punched in the index point positions of the record columns. The code hole or holes in each vertical record column represent a single character or functional operation. The characters printed along the top edge of each card DC–1 and DC–2 are those which are represented, respectively, by the code designations 101 appearing in the record columns vertically aligned therewith. Where a code designation in a record column represents a functional operation, the identifying legend has been omitted, from Figs. 10 and 11, but its identity may be readily determined by reference to Fig. 9.

*Record sensing unit*

As indicated hereinabove, the record sensing unit 20 comprises the card carriage 21, and a means for successively feeding record cards into the carriage. When operating, the card carriage 21 is moved along step-by-step past the row of reading brushes 122 so as to sense successively the record columns of the card in the carriage, there being a separate reading brush 122 for each index point position of a record column. The unit 20 also comprises a column position control mechanism referred to herein as the "reading strip," and which is provided with eighty column reading positions corresponding, respectively, to the record column sensing positions of the card carriage. As will later appear, the reading strip functions to control preselected character punching and functional operations of the apparatus at any desired card column reading position of the card carriage 21. The reading strip control means is shown more clearly in Figs. 1 and 8 and will be described in detail hereinafter under a separate heading. The structural details of the record sensing unit 20 will now be described.

Figure 2:
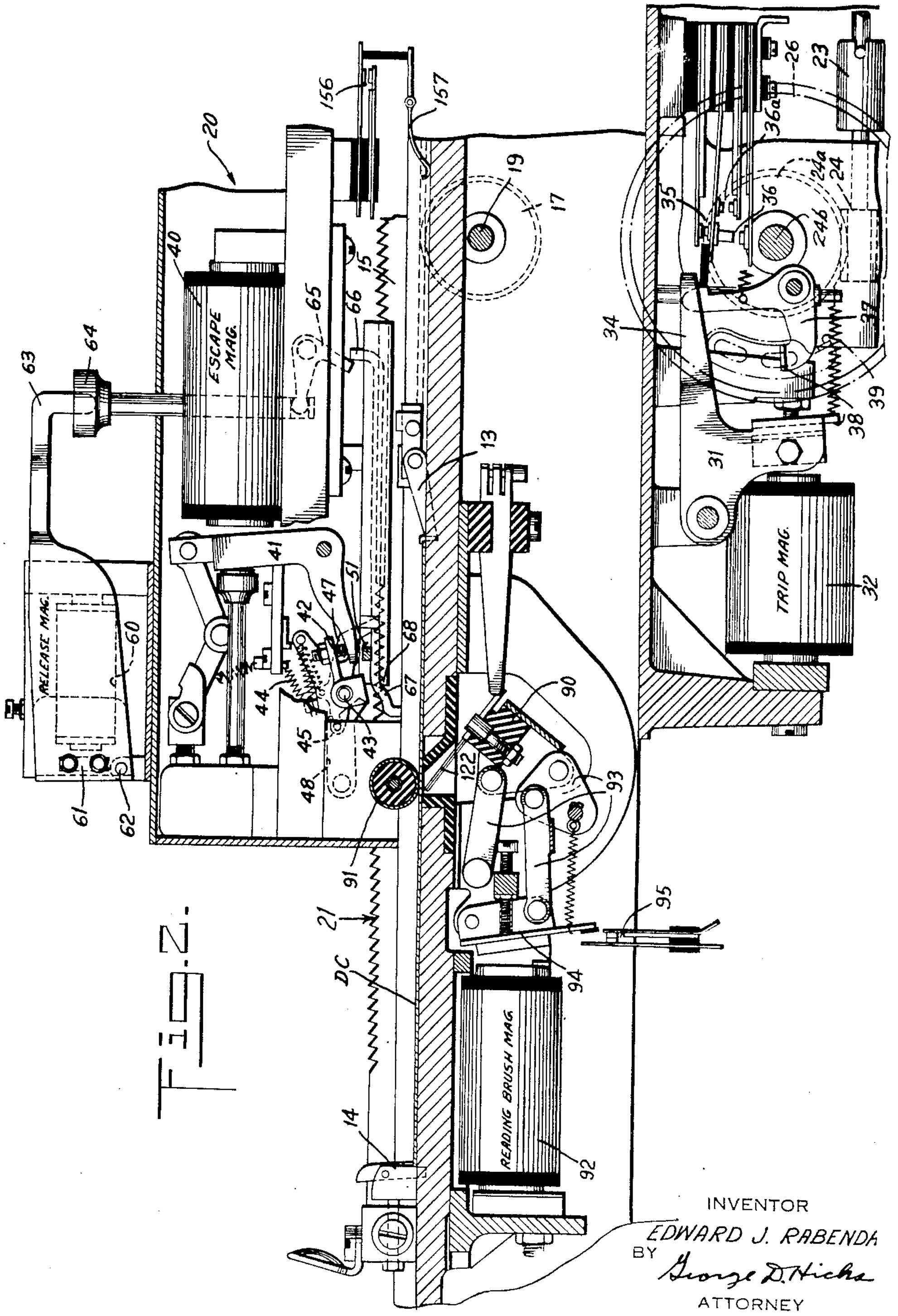
Fig. 2 is an enlarged fragmentary vertical sectional view taken on the line 2—2 of Fig. 1 and illustrating the construction of the record sensing unit forming a part of the preferred embodiment.
Figure 3:
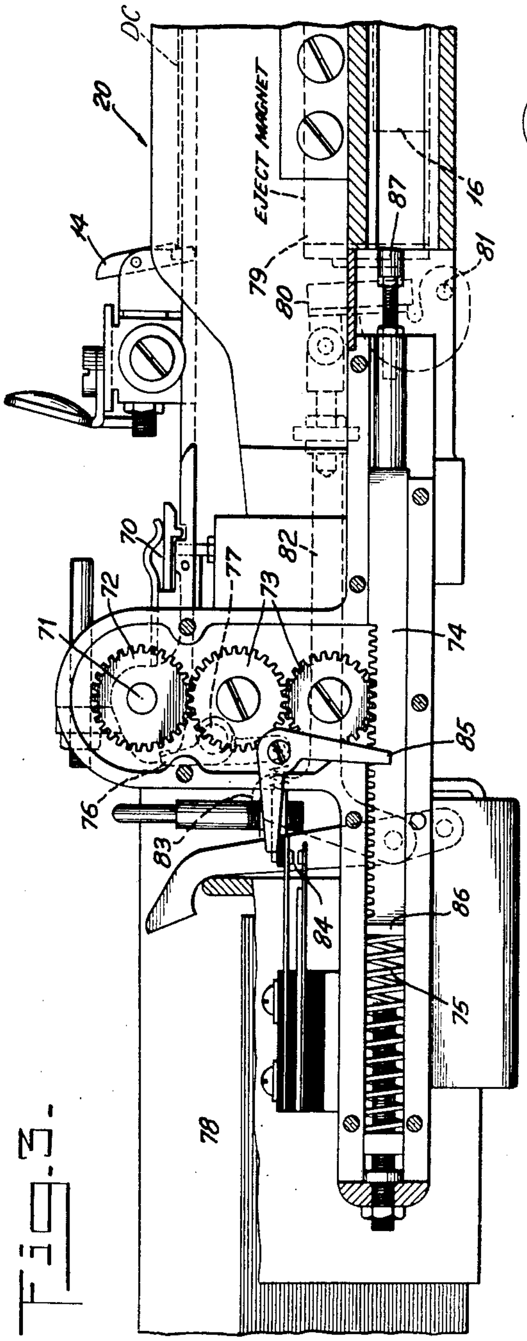
Figure 4:
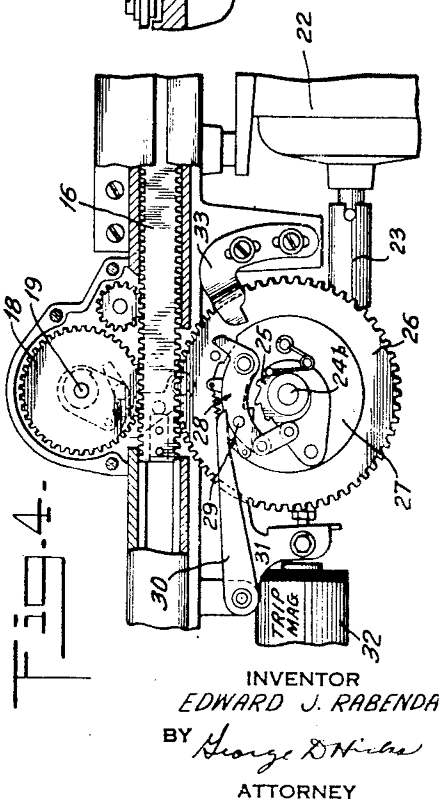
Fig. 4 is an enlarged fragmentary vertical section through a portion of the sensing unit and showing a clutch mechanism and its related operating means and a drive motor which comprise a means for returning the record holding carriage to its initial sensing position.

*Card feeding means.*—Referring to Fig. 1, the record cards DC to be sensed or analyzed are placed in a magazine designated 120 from which they are advanced singly by means of a picker 121 toward the left to present their first or #1 record column to a card sensing position above the card sensing brushes 122 (see also Fig. 2). In this position, the reciprocable card carriage 21, comprising a pusher 13 and a forward guide 14, engages the card and advances it, step-by-step, under control of an escapement mechanism to be described later. Pusher 13 and guide 14 are carried by an escapement rack 15 which also forms a part of the card carriage 21, and the picker knife 121 is carried by a rack bar 16. Rack 15 has a gear 17 meshing with its lower edge (see Fig. 2) and rack bar 16 has a gear 18 (see Fig. 4) meshing with its upper edge, both gears being mounted on a cross shaft 19 (see Fig. 1). Due to this connection between the elements, the movement of rack bar 16 and picker 121 toward the left, as viewed in Fig. 1, is accompanied by movement to the right of the card carriage 21, including the rack 15, pusher 13, and forward guide 14. At the commencement of a card feeding operation, the picker 121 and pusher 13 are in positions as shown in Fig. 1.

The operation of card feeding just outlined is more fully explained in Patent No. 1,772,186 granted to F. L. Lee et al. for a duplicating punching machine. The escapement mechanism referred to herein is of the same general nature as that disclosed in the Schaff Patent No. 1,426,223 and a brief description thereof will be given later.

Secured to the underside of the base of the sensing unit 20 is a motor 22 (Fig. 4) coupled to a stub shaft 23 (see also Fig. 2), to which is secured a worm 24 in mesh with a worm wheel 24a secured to a shaft 24b, one end of which has secured thereto a ratchet-shaped clutch element 25. Loosely mounted on shaft 24b is a gear 26 meshing with teeth on the lower edge of rack bar 16 and on which gear is mounted a disk 27. Mounted upon disk 27 is a clutch mechanism generally designated by the reference character 28, one element of which is provided with a pin 29 positioned for engagement by a finger 30 integral with the armature 31 of a trip magnet 32. With the machine at rest, the parts occupy the position shown in Fig. 4 and, when magnet 32 is energized, the finger 30 will operate the clutching mechanism to couple the disk 27 to the rotating ratchet 25, so that the disk 27 and gear 26 are rotated counterclockwise to drive the rack bar 16 toward the left. The clutching mechanism 28 is constructed, as explained in greater detail in the patents referred to, so as to remain in engagement for substantially a complete revolution, at the completion of which time the clutching mechanism engages a fixed member 33, which effects uncoupling of the parts, whereby they may automatically return to the position shown in Fig. 4 under the influence of a spring (not shown). This power drive of rack bar 16 toward the left has the same effect as the manual movement thereof explained in said Patent No. 1,772,186, that is, a record card DC will be advanced to sensing position in the card carriage 21 where it will be engaged by the pusher 13 for further step-by-step advancement, and rack bar 16 may thereafter return to its home position without disturbing the advanced position of the card or pusher 13, this being permitted by the one-way clutch structure 28.

Also integral with the armature 31 of the trip magnet 32 is an arm 34 (see Fig. 2), the free end of which is adapted to bear upon a movable blade of three pairs of latch contacts, 35, 36, and 36*a*, respectively, so as to open contacts 35 and close contacts 36 and 36*a* when the trip magnet 32 is energized, and the latch contacts will be maintained in such shifted position by a latching bell crank 37, the lateral extension 38 of which is adapted to be engaged by a plate 39, secured to gear 26, at the termination of the driving movement of the latter. The latch contacts 35, 36, and 36*a* are used in controlling operating circuits of the apparatus including energization of the driving motor 22. The respective functions of these contacts will be more fully explained in connection with the circuit diagram.

*Escapement means.*—When a record column of a card DC is in position above the sensing brushes 122 (Fig. 2), further advance of the card carriage and card is controlled by the escapement mechanism which in turn is responsive to the energization of escape magnet 40. Upon energization of magnet 40, its armature 41 will be rocked about a pivot in a clockwise direction and through a screw 42 secured to rod 43 will rock the rod 43 counterclockwise, as shown in Fig. 2, against the tension of a spring 44. The rod 43 is rocked as an incident to each spacing operation and has secured to one end thereof oppositely extending arms 45, 46 (see also Fig. 6), of which arm 46 is provided with a laterally extending pin for engagement with an enlarged opening in a stepping dog 47 which is loosely pivoted on rod 43. Opposite arm 45 is provided with a pin extending into a slot formed in the locking dog 48. When rod 43 is rocked (clockwise as viewed in Fig. 6, counterclockwise as viewed in Fig. 2), arm 46 will, through its pin and slot connection with dog 47, lift the latter out of one of the notches of the rack 15 and at the same time arm 45 will depress locking dog 48 into a notch between adjacent rack teeth. At this time a spring 49 advances the loosely pivoted dog 47 a short distance just sufficient to permit this dog to move above the top of the next tooth. When the locking dog 48 is again raised due to the deenergizing of magnet 40, stepping dog 47, due to the movement of rack 15, will ride down along the next tooth until it strikes the end thereof and the carriage is thereby arrested. The usual spring drum (not shown) is provided to bias the rack 15 toward the right, as viewed in Fig. 6. The detailed structure of this dog and rack arrangement is well known and need not be further described, and it is sufficient to note that for each operation of the escape magnet 40, the rack 15 is advanced one step or tooth, carrying with it the pusher 13 and the forward guide 14, so that the card is likewise advanced one step, each step of advancement being coextensive with the columnar spacing of the columns of the card.

Figure 6:
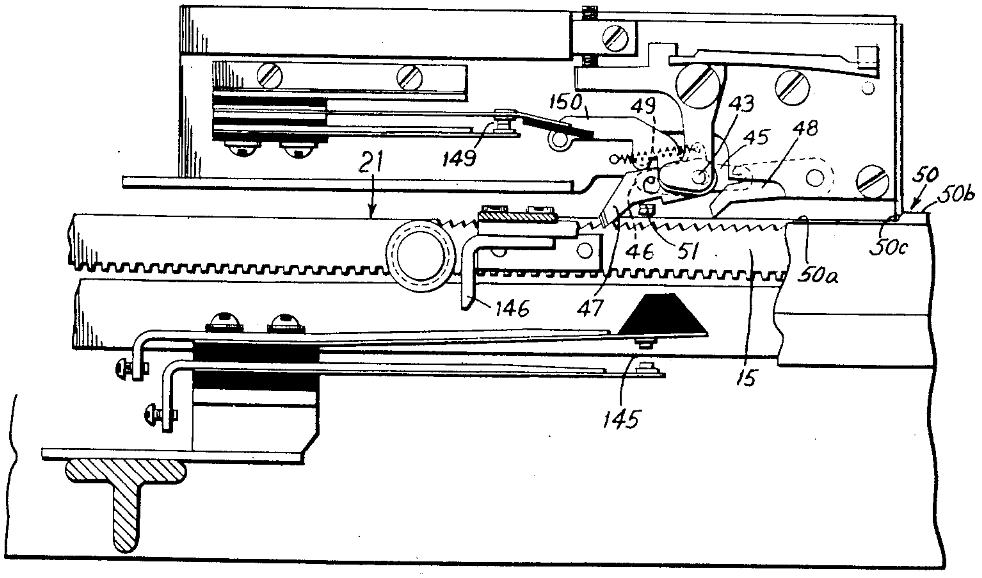
Fig. 6 is a fragmentary vertical section showing details of construction of the escapement mechanism for spacing the record card holding carriage.
Figure 7:
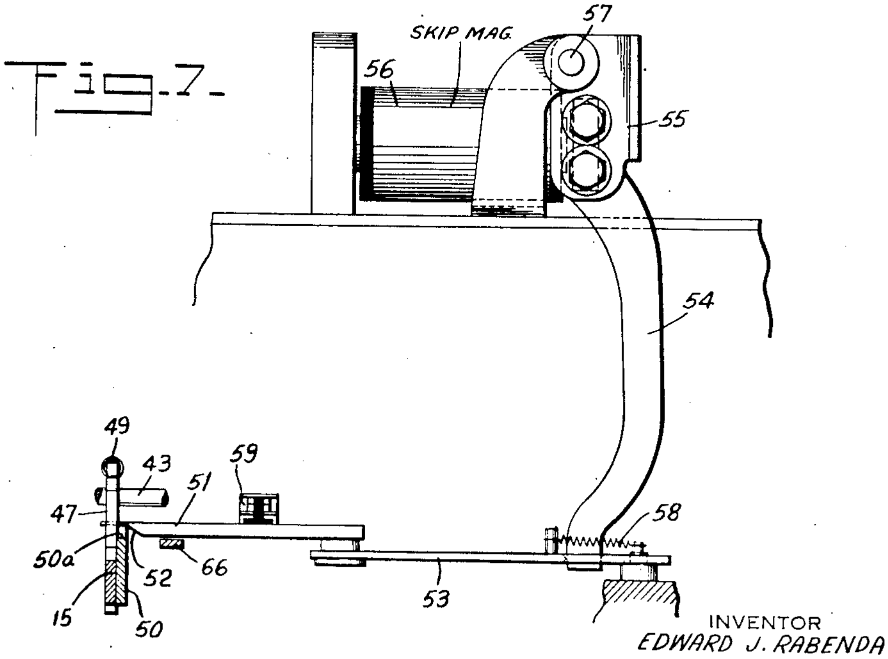
Fig. 7 is a detail view showing the mechanism for effecting a skipping or tabular operation of the card carriage.
Figure 6:
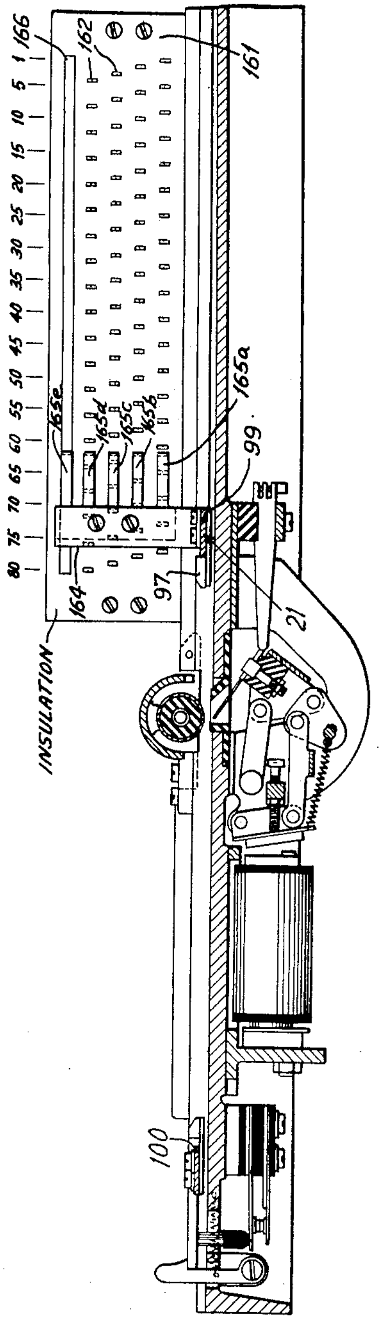

*Skip control means.*—The card reading unit 20 is provided with the usual skip bar indicated at 50 (Figs. 6, 7, and 12) which is removably attached to the escapement rack 15 at one side thereof and is provided with suitable notches or low portions 50*a* and high portions 50*b* separated by cam surfaces 50*c*, which cooperate with the usual skip lifter arm 51 which has a beveled end 52 (Fig. 7). The function of this skip bar 50 is to effect skipping of the card carriage and card over the record columns or fields which are not to be sensed. The right-hand end of the lifter 51 (see Fig. 7) is connected to the left-hand end of a slider 53 and the right-hand end of the latter is provided with an opening into which the free end of a finger 54 extends. This finger is integral with armature 55 of skip magnet 56, the armature being pivoted at 57. With this arrangement, energization of magnet 56 will cause lateral shifting of skip lifter 51. Upon deenergization of magent 56, the parts are returned to normal by a spring 58. The left-hand end of the lifter 51, as viewed in Fig. 7, lies under the escapement dog 47 and upon energizing the skip magnet 56, the lifter 51 is moved toward the left and the beveled portion 52 thereof will engage the bar 50 and thereby cam the lifter 51 upward. If a notch portion 50*a* lies opposite the lifter when the magnet 56 is energized, the cammed upward movement of the left-hand end of lifter 51 will not be sufficient to engage the dog 47; but, if a high portion 50*b* lies opposite the lifter, the latter will be raised high enough to engage the dog 47 and lift the latter out of engagement with the rack 15 and thereby effect skipping movement of the card carriage which will continue until the lifter 51 falls within the next notch 50*a*. Thus, the skip bar 50 will be so formed, or cut, that a high portion 50*b* will lie opposite the lifter 51 when the card carriage is in the card column reading positions which are intended to be skipped.

An alternative manner of effecting a skipping operation, is to energize the skip magnet 56 while the card carriage is at the column reading position immediately preceding a group of columns intended to be skipped. This will result in the lifter 51 being moved laterally over the top of the bar 50 at a notch 50*a*. As explained, this will not effect skipping as the lifter 51 is not cammed by the notch 50*a* high enough to raise the dog 47 from the rack 15. However, when the escape magnet 40 is energized, at the end of the sensing operation, the escaping of the card carriage to the next column sensing position will move a cam surface 50*c* and then a high portion 50*b* underneath the extended end of the lifter 51 and will thereby raise the lifter 51 high enough to hold the dog 47 in its raised position and keep the latter from reengaging the rack 15 and will thereby cause the card carriage to continue its movement until the next low or notch portion 50a is reached, where the lifter 51 will move to its lower position and thereby permit the dog 47 to reengage the rack and stop the card carriage. Located above skip lifter 51 is a pair of contacts 59 which are opened when the lifter arm 51 is raised by virtue of engagement with a high portion 50b of skip bar 50. The contacts 59 are referred to hereinafter as the "skip lifter" contacts and the purpose of these contacts will be fully explained in connection with the circuit diagram.

*Release control means.*—A further means by which the card may be advanced is controlled by a release magnet designated 60 (Fig. 2) which, when energized, will rock its armature 61 about pivot 62 causing the free end of an integral finger 63 to depress a vertical rod 64 shown as being in the shape of a key. The mechanism controlled by this rod or key 64 is well known in this type of machine and is briefly as follows. When the rod 64 is depressed, the lower end thereof rocks a bell crank 65 and thus slides a member 66 toward the right as viewed in Fig. 2. This member 66 is suitably mounted for such movement, and is provided at its left-hand end with a cam surface 67 which coacts with the edge 68 of the supporting plate. The member 66 also extends beneath the skip lifter 51 in a position generally as indicated in Fig. 7, so that as the member 66 is moved toward the right (Fig. 2), cam surface 67 engaging plate 68 will cause an upward tilting of the left end of the member 66 which in turn will lift the skip lifter arm 51 upward to engage and raise the stepping dog 47 out of engagement with the rack 15, whereupon the card carriage 21 will be free to advance uninterruptedly toward the left. Frictional engagement of the parts will maintain the member 66 in its shifted position so that the escapement of the rack, when initiated by the release magnet 60, will not be interrupted until the card has been fully advanced, that is, until the last or 80th card column is advanced to the sensing position. At this time a suitable projection carried by the rack will engage a depending extension of the left extremity of member 66 and will slide the member toward the left and back to the position it occupies in Fig. 2.

Briefly summarizing the foregoing, it is noted that after the record card DC has been initially advanced to present the first card column to the card sensing brushes 122, its further advance is controlled to provide a column-by-column stepping movement through the escape magnet 40. Multiple column advancement is controlled through the skip magnet 56 in cooperation with the skip bar 50, and the complete release of the card from any position to its last column position is controlled by the release magnet 60.

*Automatic ejecting means for the record card.*—The record sensing unit 20 is provided with mechanism for automatically removing the sensed cards DC from the carriage 21 and depositing the same in a receptacle provided for the purpose. This mechanism is more fully shown and described in Patent No. 1,916,965 issued July 4, 1933, to J. M. Cunningham. Briefly, a gripper 70 occupies the position shown in Fig. 3 with its jaws open in card receiving position during the period that the card is advanced step-by-step by the escapement mechanism. The gripper is carried by the rod 71 to which is secured a gear 72 which through idlers 73 is connected to a slidable rack 74 which is normally biased toward the right by a spring 75. A pivoted latching member 76 engages a latching shoulder at the left-hand extremity of the gripper and thereby serves to hold the parts in the position shown in Fig. 3. When the latching member 76 is rocked counterclockwise about its pivot 77, the spring 75 will be free to drive the rack 74 toward the right and through the gearing 73 and 72, flip the gripper 70 in a counterclockwise direction. This flipping action is effected after the card has been advanced to its extreme left-hand position, at which time the leading edge thereof is between the jaws of the gripper. Releasing the gripper will cause the jaws to automatically clamp the end of the card thereto so that the card will be swung in an arc about the rod 71 and deposited in the receptacle 78, suitable means being provided to cause the jaws to release the card.

For the purpose of actuating the latch member 76, there is provided the usual eject magnet 79 (Fig. 3) which, when energized, will rock its armature 80 about pivot 81 and draw a link 82 toward the right. The left extremity of the link is provided with an extension 83, which, when the link is moved, will strike a depending arm of the latch member 76 and effect the above-described rocking action thereof which results in the ejection of the card by the gripper. This card ejecting operation will bring about the automatic feeding of another card from the magazine 120 into position to be sensed by the brushes 122. The latter operation is initiated by means of a pair of automatic start contacts designated 84 (referred to hereinafter as the "auto start" contacts) which are closed through a pivoted bell crank 85, a depending arm of which is engaged by a lateral extension 86 of rack 74 when the rack has been released for movement toward the right.

In a manner to be explained in connection with the circuit diagram, the auto start contacts 84 close a circuit through the trip magnet 32 and thereby control the operation of the driving motor 22 which, as explained, will cause advance of a new card from the magazine 120 and also cause movement toward the right of the card carriage 21 including the rack 15, card pusher 13, and forward guide 14. As the rack 16 is moved toward the left, its left-hand end will engage an adjustable extension 87 carried by the rack 74 and will thereby positively restore the rack 74 toward the left and through the gearing shown will return the gripper to the position it occupies in Fig. 3, the latch member 76 being spring-biased to engage and hold the gripper in such position until the newly advanced card has been sensed and advanced to its last column position, whereupon the above described automatic ejection and initiation of a new card feeding operation will take place.

*Record card sensing means.*—The card sensing brushes 122 are shown in Fig. 2. As explained previously, there are provided twelve of these brushes positioned side-by-side, there being one for each of the twelve horizontal rows of index point positions of the card DC. The brushes 122 are mounted in an insulating brush holder 90 which is mounted so that the brushes 122 are given substantially a vertical movement upward, from the position shown in Fig. 2, to contact the card DC and to effect electrical connections through the perforations therein with a common contact roller 91. The upward movement of the card reading brushes 122 is effected by a reading brush magnet 92 which, when energized, will cause the brushes 122 to move upwardly through linkage generally designated 93. This mechanism is of the usual construction and a detailed description thereof may be found in the patents referred to. Its purpose is generally to maintain the brushes in their lower position, when they are not actually sensing perforations in the card, and thereby preserve them against undue wear and also against damage by an inadvertent backward movement of the record cards. The armature 94 of magnet 92 is arranged when attracted by the magnet to open a pair of contacts 95, referred to hereinafter as the "reading brush magnet contacts." The function of contacts 95 will be explained hereinafter in connection with the circuit diagram.

Figure 5:
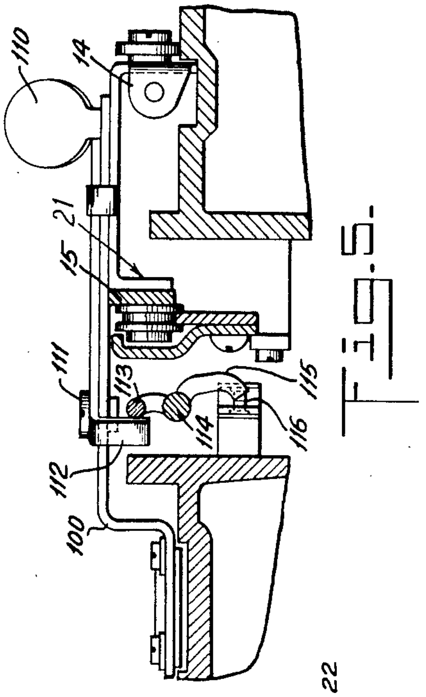
Fig. 5 is a fragmentary sectional view showing a manually operable cut-out control device for the record card feeding mechanism.

*Manual back-spacing means.*—Referring to Figs. 1 and 5, it is noted that the card carriage 21 includes a cross arm 100 extending rearwardly from the rack 15. Mounted on the cross arm 100 is a finger piece 110 pivoted at 111 which finger piece also has a depending arm 112. When it is desired to manually back-space the cards, it is done by pressing against the finger piece 110, whereupon a slight rocking thereof is effected before the card carriage actually moves. During this slight rocking, the extension 112 will rock a universal bar 113 about its pivot 114 to cause a depending arm 115 thereon to open the so-called "cut-out" contacts 116. As will be explained hereinafter, these contacts 116 are located in the energizing circuit for the reading brush magnet 92 and are provided to insure that this magnet is deenergized and its related brushes 122 in down position before there is any backward movement of the cards which might injure the brushes.

*Miscellaneous contact means.*—Several contacts in addition to those described are provided in the machine, and the operation of these will be pointed out before the entire operation of the apparatus is explained in connection with the circuit diagram.

In Fig. 6 is shown a pair of contacts 145 known as the "last column" contacts. These contacts are closed by a downwardly extending arm 146 secured to the escapement rack 15 and are so located that, when the card carriage 21, including the escapement rack, is advanced to the position in which the last or eightieth column of the record card DC is presented to the card reading brushes 122, the extension 146 will be in engagement with and close contacts 145.

Also in Fig. 6 are shown the "floating cam" contacts 149, one blade of which is shifted by an arm 150 which is loosely pivoted on the rod 43 and which has a lateral extension resting upon the upper edge of the stepping dog 47 so that when the dog is raised to effect escapement of the carriage 21 from one column reading position to the next, or to effect a skipping or release operation, the dog through arm 150 will open the contacts 149 and will keep the contacts open until the dog is again lowered into engagement with the rack 15.

At the right of Fig. 2 there is shown a card lever 157 lying in the path of the record card as it passes from the magazine to its #1 column sensing position. When a card is fed from the magazine, the card lever 157 is rocked to permit the closing of a pair of suitably disposed "card lever" contacts 156. Closure of the card lever contacts 156 at the appropriate time enables the machine to operate automatically; whereas if the card lever contacts 156 fail to close, indicating the absence of a card, the automatic operation of the machine is prevented or interrupted.

*Reading strip control means.*—Suitably mounted on fixed brackets 160 (Figs. 1 and 8) and extending upwardly from the rear of the main supporting frame of the card sensing unit 20, is a plate 161 of insulating material and extending through suitable openings provided in the plate 161 are a plurality of contact inserts 162 formed of suitable electrically conducting material. The contacts 162 are arranged in four horizontal rows of twenty contacts each, there being a contact insert 162 corresponding to each of the 80 record columns of the cards. The scale above the plate 161 in Fig. 8 indicates the card columns which correspond to the inserts 162. The card carriage 21 also includes a cross arm 99 fixed to the rack 15 and mounted on the arm 99 is an upstanding bracket 164 which carries five contact blades 165*a*, 165*b*, 165*c*, 165*d*, and 165*e*, respectively. The bracket 164 and the blades are formed from a single piece of electrically conducting material. The four blades 165*a* to 165*d* inclusive are spaced so that they will engage respectively with the four rows of contacts inserts 162 as the card carriage 21 is moved from one extreme position to the other. The fifth blade 165*e* continually engages a common contact insert or strip 166 also extending through the vertical plate 161 and being coextensive in length with the rows of contact inserts 162.

The arrangement of the elements of the reading strip and the function thereof will be apparent from an examination of Fig. 8. With the card carriage at the extreme right-hand position of Fig. 8, which is the position where the #1 column of the card DC is in the position to be read, the blade 165*a* will engage the right-hand contact insert 162 of the bottom row and thereby electrically connect such insert and the common strip 166. It will be apparent that, in this position, none of the other blades 165*b*, 165*c*, or 165*d* will contact inserts 162 of their respective rows. Likewise, when the card carriage escapes to the reading position for the #2 record column of the cards, only blade 165*b* will engage an insert 162 which will be the right-hand insert of the row next to the bottom; and, when the card carriage escapes to a reading position for card column #3, only the right-hand insert 162 of the third row from the bottom will be engaged and this by the blade 165*c*. From this explanation it will be obvious that the spacing of the inserts is such that for each of the eighty column reading positions of the card carriage, a corresponding insert 162 is electrically connected to the common strip 166.

As will be explained more fully hereinafter in connection with the wiring diagram, each contact insert 162 is electrically connected to a corresponding plughub 167 of a plugboard 170. A number of plughubs 167, their related inserts 162 and wiring connections are indicated diagrammatically in Fig. 23*a*, and the complete set of plughubs 167 is shown in the upper part of the plugboard 170 in Fig. 22. It is noted that in Fig. 23*a*, the rear or reverse side of the vertical plate 161 is shown, which is the side opposite to that shown in Fig. 8. Thus, the arrangement of inserts 162 as they appear in Fig. 23*a* is in reverse order with respect to their arrangement in Fig. 8. The arrangement in Fig. 23*a* is the same as that of the corresponding plughubs 167 in Fig. 22. The reading strip and plugboard connections provide a means for selectively controlling operations of the illustrative embodiment from the different column reading positions of the card carriage 21, as will be more fully explained hereinafter.

As shown in Fig. 22, the plughubs 167 are arranged in four horizontal rows and are identified by the legend "Card columns." The numerals appearing along the top of each of the four rows of plughubs indicate the column reading positions occupied by the card carriage 21 at the time the corresponding hubs are connected electrically to the common contact strip 166 through their related contact inserts 162, the blades of the group 165*a* to 165*d* and the blade 165*e*. In other words, when the card carriage is in position to read the #1 record column of the card therein, the left-hand plughub 167 in the top row of Fig. 20, which is the one beneath the numeral "1," is connected electrically to the common contact strip 162 by blades 165*a* and 165*e*; and likewise, when the card carriage escapes to the #2 column reading position, the next plughub 167, which is the one at the right of the hub 167 beneath the numeral "1," will be electrically connected to the common strip 162 by the blades 165*b* and 165*e*; and this same relation exists between the remaining seventy-eight hubs 167 and their related column reading positions of the card carriage.

*Six-position record tape*

Before considering the detailed construction and operation of the tape perforator, attention is directed to Fig. 20 showing a section of a record tape 201 having all of the code designations 202 of a predetermined 6-position code system punched therein. Code designations representing both the characters and the required functional operations are punched in the tape 201. As shown, a legend identifying each code designation 202 appears at the top edge of the tape 201, and in line with the transversely extending record column of the tape bearing such code designation.

Fig. 21 of the drawings shows two fragments of a section of tape 201 bearing code designations of the 6-position code system punched therein as a result of the operation of the preferred embodiment according to a selected example. According to this example, card DC-1 of Fig. 10 and card DC-2 of Fig. 11 are read in succession by the sensing unit 20, with the skip bar 50 cut as shown in Fig. 12 and with plug connections made as shown in the plugboard 170 of Fig. 22. In order to conserve space, a portion of the tape of Fig. 21 bearing some of the designations recorded as a result of the just-mentioned operation, has been omitted, but enough of the tape has been shown to disclose fully the operation of the preferred embodiment according to the selected example.

*Code perforator*

As stated hereinabove, the six-position code perforator 200 is substantially the same as is disclosed in U. S. Patent No. 2,353,034. The unit 200 is shown in detail in Figs. 13 to 19 inclusive. As shown in Figs. 13, 14, and 15, the perforating unit 200 includes the individual code punch elements CP, one for each of the six code positions, and a common die block 220. The punch elements are slidably arranged in a common punch guide block 221 and are normally held in raised positions by means of individual springs 222. The said springs are attached to a bracket 223 which is suitably secured to side plate 224. The said punch guide and die blocks are also suitably secured to the side plate 224. Each punch element CP is provided with a recess 225, into which recess is placed one end of a positionable interposer 226 having a yoke portion 227. An individual interposer 226 is provided for each punch element CP. An elongated cam or eccentric 228 is carried by, or if desired, formed on shaft 229, which shaft is suitably journaled in the side plate 224 and end plate 230. The eccentric 228 is located within the bows of the yokes 227 of the individual and adjacently arranged interposers 226, to support and actuate or oscillate the said interposers. Normally, during the rotation of the eccentric, the interposers are moved downwardly and upwardly (as viewed in Fig. 14) by the supporting eccentric and about the pivotal connections formed by the ends of the interposers engaging the recesses 225 of the related punch elements. Under these conditions, it is seen, that the free ends of the interposers are partially rotated, first in one direction and then the other direction, or stated in other words, the said free ends of the interposers are oscillated. Suitably disposed stop guides 232 and 233 are provided to maintain proper alignment of the said oscillated interposers.

Individual latch arms 234 are provided, one for each interposer, and are pivotally mounted in a slotted guide block 235 secured to the side and end plates. Near the lower end of each latch arm, a pair of spaced latching fingers 236 are provided, which fingers are disposed in close proximity to, but normally held out of the path of the movable ends of the interposers by means of a slotted leaf spring 237 secured to a reset bail 238. The bail 238 is rotatably mounted on the said side and end plates, and is elongated sufficiently to permit engagement of the bail with all the latch arms 234. Spring 237 is elongated sufficiently so that the individual slotted sections engage the related latch arms.

In order to selectively operate any code punch element CP, the related latch arm 234 is partially rotated, in a clockwise direction (as viewed in Fig. 14), against the action of the said leaf spring 237, so that its latch fingers 236 engage and latch the free end of the related interposer. It is noted that the shaft 229 carrying the eccentric 228 is not constantly rotated, but operated in a start-stop fashion and that the latch arms 234 are arranged to be selectively positioned to latch the desired interposers before the rotated eccentric displaces or oscillates the said interposers. Thus, upon latching of an interposer 226 and rotation of the eccentric 228, the said interposer is positioned, by the eccentric, about the pivotal connection formed by the related latch arm and the latched end of the interposer, to force the related punch element CP downwardly (in Fig. 14), thereby causing the tape 201, positioned between the said guide and die blocks, to be perforated. The eccentric 228 is shaped so that the lower end, or cutting edge, of the displaced punch element is forced through the paper tape, and then retracted therefrom immediately and restored to the normal position shown in Fig. 14.

Locking means are also provided for holding the displaced latch arm or arms in a latched position, and for preventing displacement of undesired latch arms during the rotation of the eccentric. This means comprises a locking bail 240, which is common to all latch arms 234, and which is suitably secured to an arm 241, which arm 241 in turn is fixed to shaft 242. Shaft 242 is rotatably mounted on said side and end plates, and also has affixed thereto a spring urged cam follower arm 243 (also see Fig. 18) cooperating with cam 244 secured to the start-stop shaft 229. Cam 244 is shaped so that normally (with the shaft 229 at a stop position) the locking bail 240 is held in a position so as to be out of the path of the extension 245 of each latch arm 234. Upon displacement of the desired latch arms in the said latching position, and upon rotation of shaft 229, the follower arm 243 drops from the high portion of the cam 244 to permit the locking bail 240 to be raised in the path of the said latch arm extensions, thereby engaging the said extensions of the displaced latch arms and locking them in latching position, as shown in dotted outline in Fig. 14. This position of the said locking bail also prevents any faulty displacement of the normally positioned latch arms, since the bail is now effective to engage the extensions of any latch arms which inadvertently might be displaced during the rotation of shaft 229, thereby blocking further clockwise rotation of these latch arms and preventing engagement of the latching fingers 236 and the latching ends of the related interposers 226. The said raised position of locking bail 240 is maintained until near the end of the cycle of rotation of the shaft, when the high portion of cam 244 again engages the follower arm 233 to lower the said bail. Obviously, the bail must be lowered before the latch arms are positively restored by the action of the said reset bail 238. In practice, it has been found desirable to maintain the locking bail 240 in the raised position from the 11° point to the 280° point in the cycle of rotation of shaft 229.

In the arrangement shown, it is also preferred to render the reset bail 238 operative from approximately the 303° point to the 352° point in a cycle of said shaft 229. The bail 238 is secured to shaft 247 (also see Fig. 15) journaled in the side plate 224, which shaft has affixed thereto a spring urged arm 248 (Fig. 17). Arm 248 is resiliently connected by means of spring 249 to a cam follower arm 250 secured to sleeve 251, which sleeve is loosely mounted on shaft 247. In this manner, follower arm 250 is constantly urged against cam 252 secured to shaft 229. Said cam 252 is effective, near the end of each cycle of rotation of shaft 229 to partially rotate the follower arm 250 and shaft 247 in a counterclockwise direction (Fig. 17) to cause the bail and attached spring 237 to be partially rotated in a counterclockwise direction, as viewed in Fig. 14, to positively urge and restore the latch arms 234 to the normal position out of the path of the latching ends of the related interposers 226.

Suitable means for intermittently advancing the paper tape 201 are provided, which means in the present arrangement are operated near the end of each cycle of rotation of the shaft 229. In the construction shown, the paper tape 201 is fed beginning at approximately the 354° point in a cycle of shaft 229. The paper tape 201 is intermittently fed from a suitable supply roll (not shown) to the punching station by feed roll 253 secured to shaft 254, which shaft is suitably journaled in side plate 224 and a suitable support 255. Said feed roll 253 is provided with centrally located and equally spaced teeth 256 for engaging the centrally located feed perforations 203 in the tape 201. A positionable arcuately shaped tape finger guide 257 is provided to hold the tape against the said feed roll. Shaft 254 has secured thereto a ratchet wheel 258 (also see Fig. 16) which is advanced by a spring urged cooperating pawl 259 pivotally mounted on a suitable cam follower arm 260, which arm cooperates with cam 261. Cam 261 is shaped so as to move the follower arm 260 sufficiently to the right (as viewed in Fig. 16) so that pawl 259 is positioned ahead of one of the teeth of ratchet wheel 258. At approximately the 354° point in the cycle of shaft 229, the cam roller 262 drops from the high point of cam 261 permitting the follower arm 260 to be moved towards the left (Fig. 16), by means of spring 263, thereby causing the pawl 259 to engage a tooth of the ratchet wheel 258 and advance it one step, in a counterclockwise direction. Thus, the tape 201 is advanced to present the next blank record column to the punching station. Yieldable locking, or detent, means are provided to hold the feed roll 253 in the advanced position, which comprise the cam wheel 264 secured to shaft 254 and the spring urged pivotally mounted detent arm 265 provided with a roller 266 riding on the said cam wheel.

With this type of tape feeding and locking means, it is possible, when desired, to feed the tape in a reverse direction, step-by-step. Manually operable lever 267 is provided for this reason, and is pivotally mounted on the side frame 224. Lever 267 is connected, by a pin and slot arrangement, to member 268 which is slidably mounted on side plate 224. Member 268 carries a spring urged, pivotally mounted pawl 269 and a camming element 270. Thus, when lever 267 is partially rotated in a clockwise direction, as viewed in Fig. 16, member 268 is raised, causing pawl 269 to engage one of the teeth of cam wheel 264 and position it one step in a clockwise direction, and consequently causing the feed roll 253 to feed the tape one step, in the reverse direction. While the member 268 is being raised, the camming element 270 is effective to engage a bent-over portion 271 of the pawl 259 to raise the latter above the ratchet wheel 258 so as to permit the reverse rotation of the said ratchet wheel and feed roll.

From the description up to this point, it is understood that at or before the start of each cycle of rotation of shaft 229, the latch arms 234 are selectively positioned in any desired combination so as to be partially rotated, in a clockwise direction (Fig. 14), in order to latch the free ends of the related interposers 226. Next, the locking bail 240 is operated to engage and lock the displaced latch arms 234 in a latched position, during a major part of the cycle of shaft 229, and to prevent further latching operation by the remaining latch arm or arms during this cycle. Eccentric 228 is then effective to oscillate the latched interposers 226 causing the connected punched elements CP to be operated to perforate the paper tape 201, in accordance with the selected combination of operated punches, while the said tape is at rest at the punching station. Near the end of the cycle of shaft 229, after the punching operation, that is, when the punch elements are withdrawn completely from the paper tape and restored to the normal position shown in Fig. 14, the locking bail 240 is restored to its normal position, and the reset bail 238 is rendered operative to restore the latch arms 234 to their normal positions, thereby releasing the latching ends of the related interposers. The tape feeding mechanism is also rendered operative, near the end of the cycle of shaft 229 to advance the paper one step, thus presenting the next blank recording area of the tape to the said punch elements.

The centrally located feed perforations 203 are not originally provided in the paper tape 201, but are formed therein during each punching operation. For this purpose, a special latch arm 234a (see Figs. 13, 14, and 15) is provided, which is fixedly secured to the slotted guide block 235. This latch arm is also provided with latching fingers 236a similar to latching fingers 236, which fingers 236a constantly grip or engage the latching end of the related interposer 226a, so that, during each punching operation, the said interposer 226a is effective to operate a connected feed hole punch element (not shown) in the same manner as described hereinabove in connection with the code hole punching element CP. In this way, the centrally located feed perforations 203 are formed in the paper tape. As latch arm 234a is fixed, it is not provided with an extension 245. Also, it is to be noted in Fig. 14, that this special latch arm 234a is arranged and disposed so as not to be engaged by or interfere with the said operation of the reset bail 238 and associated leaf spring 237.

The cyclic, or start stop, operations of shaft 229 are controlled by a well-known type of electromagnetically controlled, one-revolution clutch indicated generally by the reference character 273. For a detailed description of the clutch mechanism, reference should be made to U. S. Patent No. 2,206,646, granted July 2, 1940. Consequently, the brief description to be given is deemed sufficient for complete comprehension of the present invention. In Figs. 13, 15, and 19, this clutch 273 is shown to comprise an annular member 274 which is secured to shaft 229. A slidable and spring urged dog member 275 is disposed in a suitable channel formed in the said annular member, which dog member is provided with a single tooth 276. A dog lift lever 277 is pivotally mounted in the annular member 274, and is disposed in a suitable channel-way formed in the slidable dog member 275. The free end of the said dog lift lever extends beyond the periphery of the annular member 274 and normally is positioned against a stop 278 formed on the suitably pivoted arm 279, which arm normally is urged by leaf spring 280 so that the said stop 278 is in the path of the dog lift lever 277. With the described elements of the clutch means in this position, the dog lift lever 277 is effective to hold the dog member 275 so that the single tooth 276 formed thereon is out of the path of a ratchet wheel 281, secured to constantly rotated shaft 282, and disposed in close proximity to the annular member 274. Secured to the said pivoted arm 279 is an armature 283 of an associated and suitably disposed clutch magnet CM; which armature, upon momentary energizaton of the clutch magnet CM, positions the stop 278 of arm 279 out of the path of the dog lift lever 277, thereby releasing the latter and permitting the dog member 275 to be positioned so that its tooth 276 engages the ratchet wheel 281. Shaft 282 is constantly rotated by means of motor 285, the shaft of which is connected to shaft 282 by a suitable coupling device 286. In this manner, shaft 229 is rotated. Upon completion of a cycle of rotation of shaft 229, the dog lift lever 277 is urged against the said stop 278 to disconnect the tooth of the dog member from the constantly rotated ratchet wheel 281, thus preventing further rotation of this shaft. Suitable locking means are provided for this described clutch, and comprise a suitably disposed, spring urged pawl 287 cooperating with a suitable notch formed in the flange 288 of the annular member 274.

From the foregoing, it will be apparent that each time the clutch magnet CM is energized, the clutch 273 is engaged and the perforator operating shaft 229 is rotated for one complete revolution and then stopped due to the automatic disengagement of the clutch by the stop 278. As explained above, during a revolution of shaft 229, the code punches previously selected and the feed hole punch, are operated to perforate the tape 201 and the tape is spaced to bring the next blank recording area into recording position. If no punches have been previously selected and the clutch magnet CM is energized, only a feed hole will be punched and the tape 201 is spaced.

The code punches CP are selected by the selective energizing of selector magnets of the group SM–1 to SM–6. As will appear more fully hereinafter in connection with the description of the circuit diagram, the selector magnets SM–1 to SM–6 are selectively energized as a result of the energizing of one of the punch control relays of the group R55 to R80 inclusive and R84 to R102 inclusive (see Figs. 23c to 23f inclusive). The clutch magnet CM is energized as a result of the closing of either reading control relay contacts R22a or R33b (see Fig. 23a). Each selector magnet of the group SM–1 to SM–6 is provided with an armature 290 forming one arm of a bell crank 291 which is pivoted on a shaft 292 suitably supported by the frame of the perforator. The upper end of another arm 293 of the bell crank 291 of each selector magnet is connected by a link 294 to the upper end of a related latch arm 234. Thus, upon the selective energizing of a selector magnet, its armature is operated to move its related latch arm 234 to latch its related interposer 226 and effect operation of its related code punch CP during the following revolution of the shaft 229 which in initiated by the energizing of the magnet CM.

It will be observed that the particular perforator 200, as shown in the drawing, is actually provided with seven selector magnets and with seven latch arms 234 and seven interposers 226 controlling related code punches, and that the description only provides for the selective operation of six. As stated above, the perforator 200 is the same one as is disclosed in U. S. Patent No. 2,353,034. In the present application, the seventh selector magnet is unused because the tape 201 is being perforated in accordance with a predetermined six-position code; the six code wires CW–1 to CW–6 (see Figs. 23a to 23f inclusive) being connected, respectively, to the magnets SM–1 to SM–6, inclusive. Obviously, the seventh selector magnet with its related latch arm 234, interposer 226, and code punch CP can be used when it is desired to perforate a tape in a seven-unit code.

*Electric translating means*

As explained hereinabove, the preferred embodiment includes an electric translating means which is adjusted in response to the sensing of each record column in the card DC to condition a circuit for energizing one of the punch control relays, or one of the operating relays for effecting a functional operation of the card sensing unit 20, or both, depending upon the selected plug connections made on the plugboard 170 of Figs. 22 and 23a. As will presently appear, the electric translating means is operated and the circuit conditioned thereby is closed under the control of contacts actuated by the record sensing unit 20.

Figure 23B:
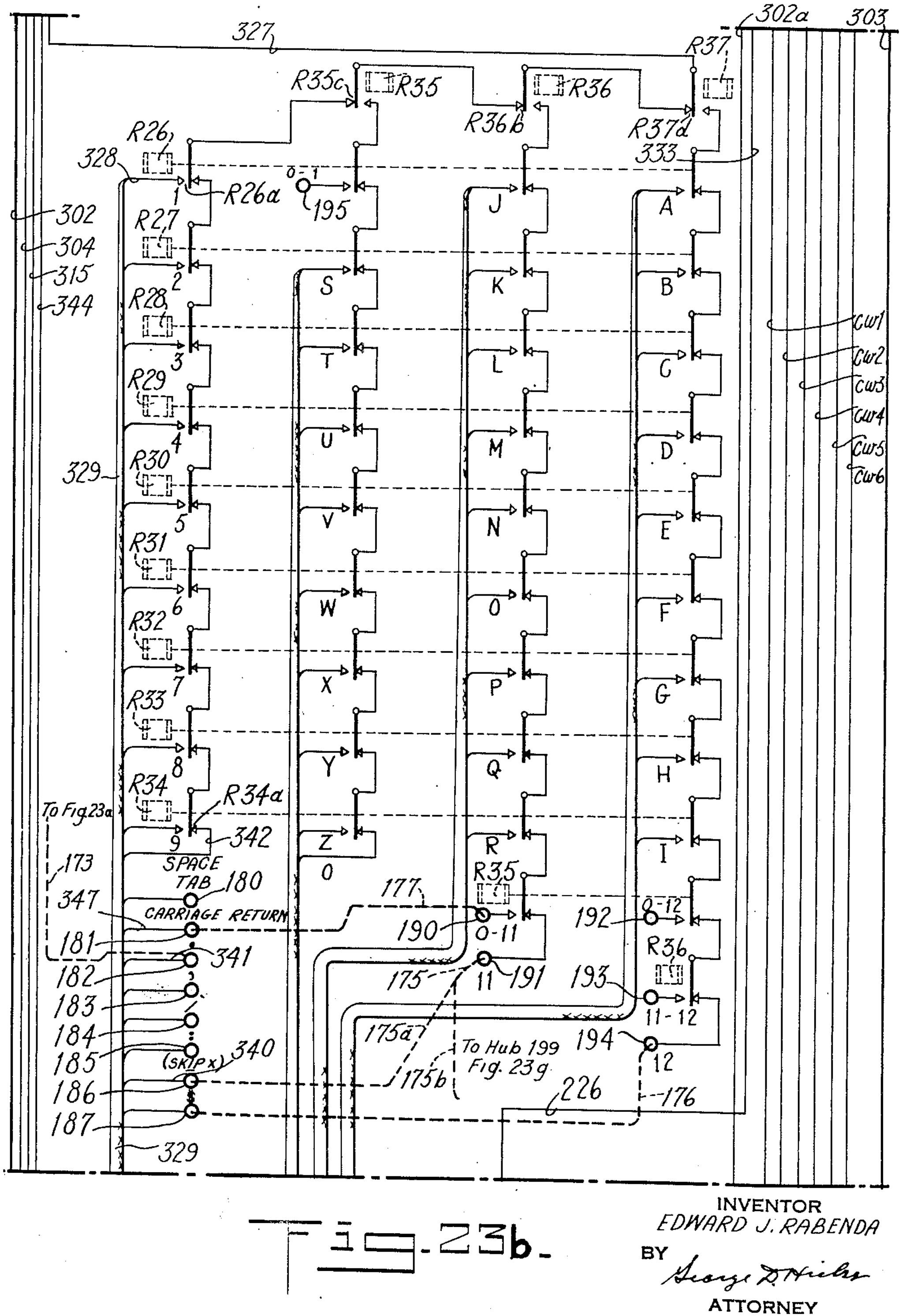
Figure 23C:
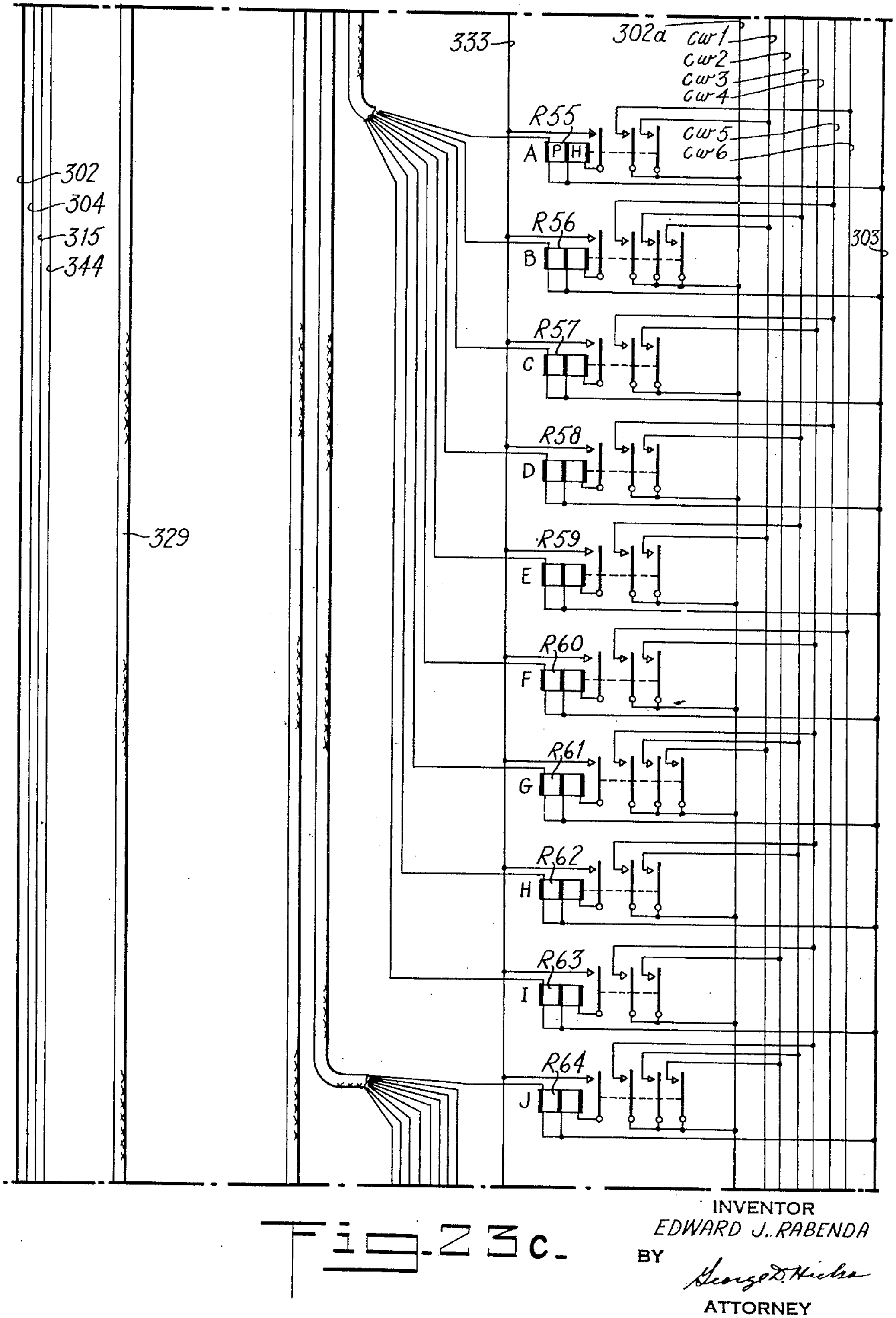
Figure 23D:
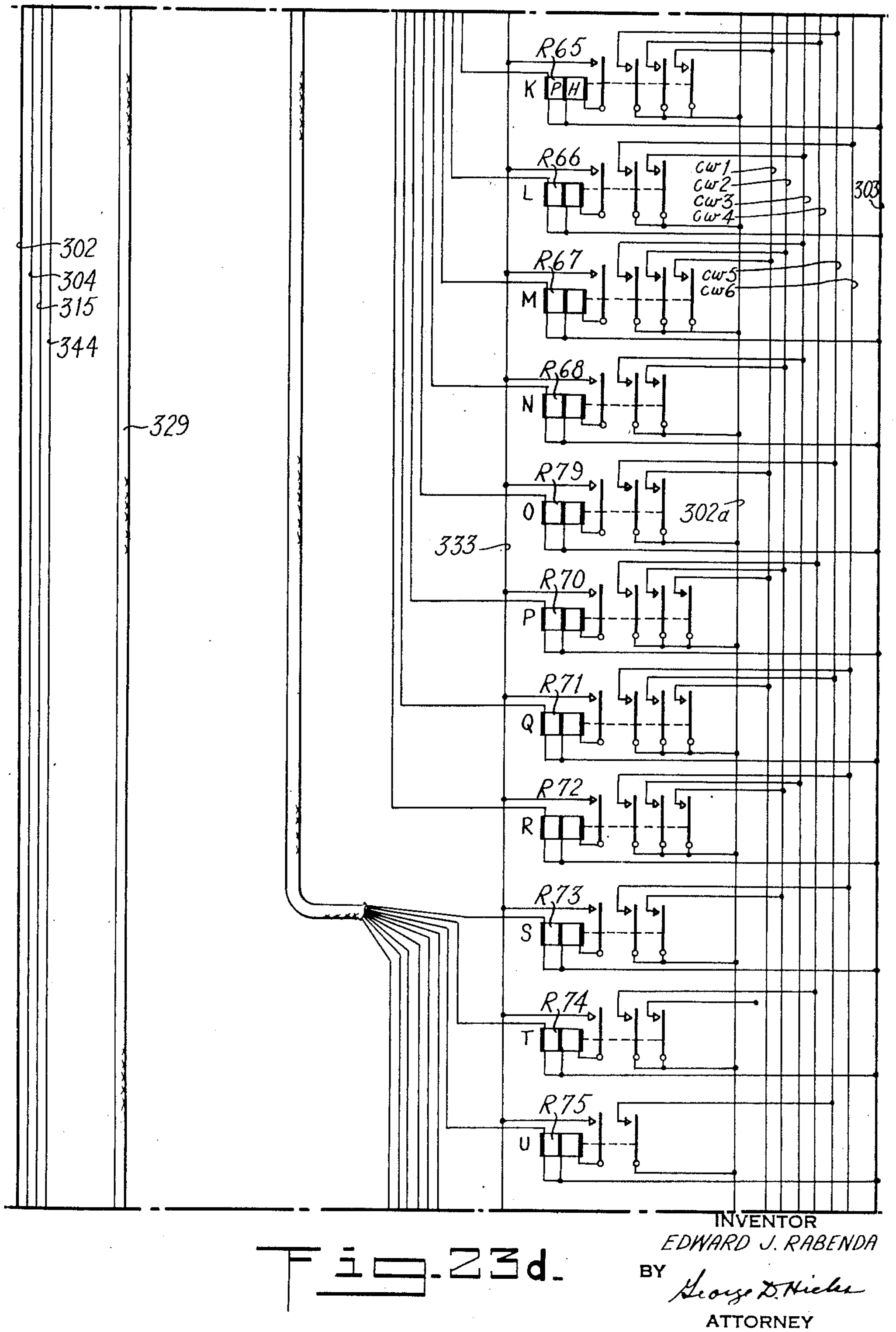
Figure 23E:
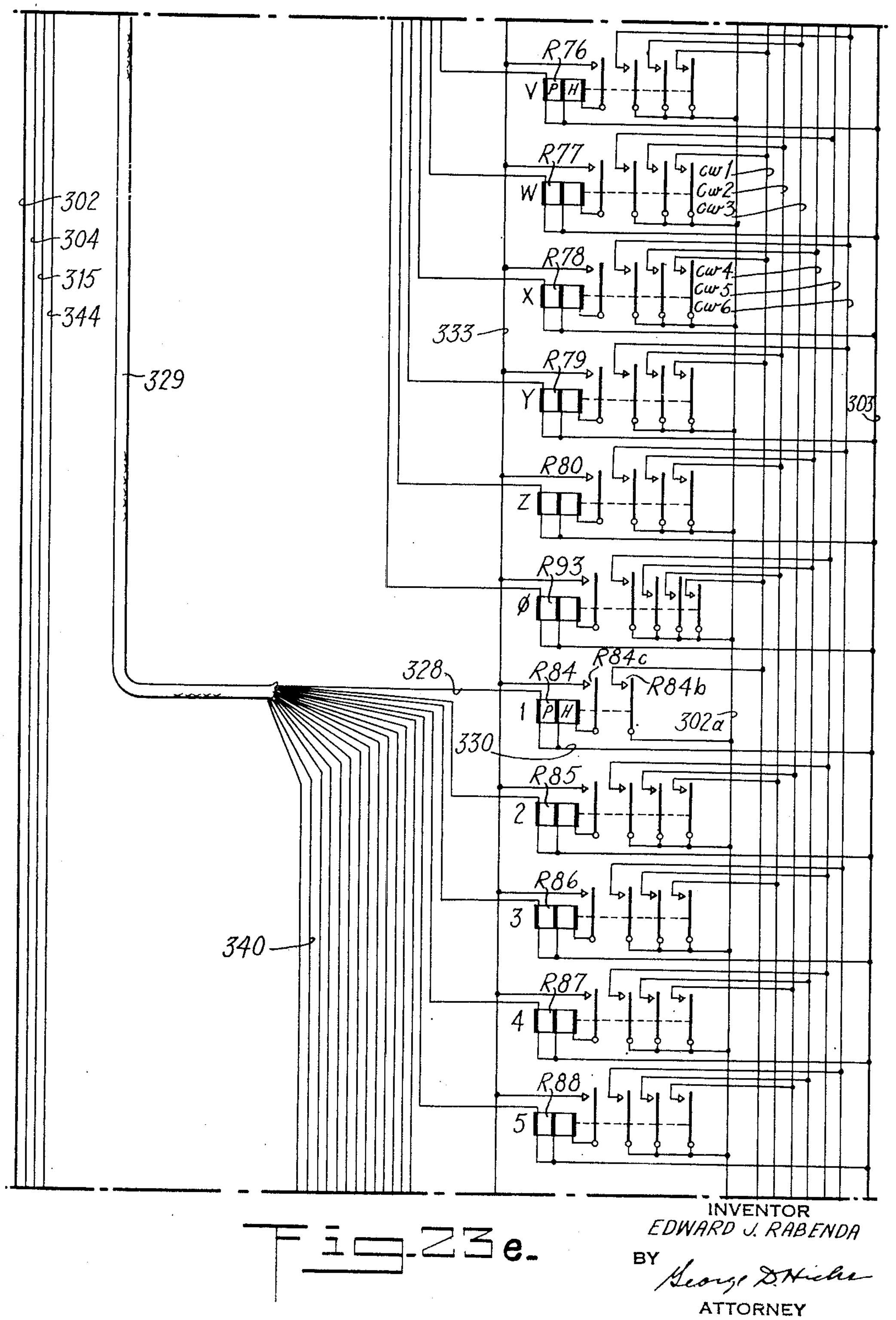

The electric translator comprises twelve translator relays R26 to R37 inclusive, which correspond, respectively, to the twelve index point positions of the predetermined code system of Fig. 9 described hereinabove. The coils of the twelve translator relays R26 to R37 inclusive are shown in Fig. 23*a* and the contacts actuated by the translator relays are shown in Fig. 23*b*. As will appear more fully hereinafter, the coils of the translator relays are selectively energized during each record sensing operation as a result of the presence of code holes in corresponding index point positions of the card column being sensed. As shown, each of the twelve translator relay coils is connected at one side thereof to the corresponding one of the twelve reading brushes 122 and at its other side to the negative side of the power source. Each coil of the translator relays actuates one or more sets of relay contacts of the transfer type which are shown in Fig. 23*b*, their associated relay coils appearing in dotted lines. Each set of these translator relay contacts is shifted from its normal position shown to its controlled, or actuated, position when its associated relay coil is energized. As shown, the sets of relay contacts are interconnected by circuit wires in such a manner as to form a translator network. For each operating condition of the translator relay coils resulting from the sensing of a record card column, the network provides a corresponding operating circuit path and each such operating circuit path includes an electrical instrumentality which effects, when energized, the manifestation of the character or functional operation represented by the corresponding sensed code designation. As stated, the electrical instrumentality may be one of the punch control relays of the group R55 to R80 inclusive, and R84 to R102 inclusive, shown in Figs. 23*c* to 23*f*, inclusive; or, the instrumentality may be one of the relays, to be presently described, for effecting a functional operation of the record sensing unit. As shown, a legend appears adjacent each punch control relay and, in each instance, the legend indicates the character or functional datum represented by the code designation 202 punched in the tape 201 as a result of the energizing of the relay. The punch control relays for punching the code designations 202 representing the letters of the alphabet and the numerals and the column spacing operation, are permanently wired to the translator relay network. The punch control relays R95 to R102, inclusive (Fig. 23*f*) which, as indicated, effect punching on the tape 201 of designations 202 representing certain functional operations and certain punctuation marks are connected, respectively, by permanent wiring to corresponding inlet plughubs of the group 180 to 187, inclusive appearing in the lower left-hand corner of Fig. 23*b*. Also, certain of the contacts of the translator are connected to exit plughubs 190, 191, 192, 193, 194, and 195 and adjacent each of the latter hubs appear legends indicating, respectively, the code combinations 101 in the 12-position code which, when sensed, condition operating circuits including such hubs 190 to 195, inclusive. It will be readily apparent that the exit hubs 190 to 195, inclusive of the translator network may be selectively plugged to the inlet hubs 180 to 187, inclusive which are connected to the punch control relays R95 to R102, inclusive and also to inlet hubs 197, 198, and 199 (Fig. 23*g*) which, as will appear later, are connected, respectively, to relays for effecting functional operations of the record sensing unit 20. These exit and inlet hubs also appear on the plugboard 170 of Fig. 22. For the purpose of disclosing the operation of the preferred embodiment, certain selected plug connections have been made between the hubs and these plug connections are shown in dotted lines in Figs. 23*a*, 23*b*, and 23*g*, and in full lines in Fig. 22.

*Operation*

The operation of applicant's improved form of card-controlled tape punch will now be described in connection with the composite wiring diagram shown in Figs. 23*a* to 23*g*, inclusive. In order to facilitate an understanding of the operation of the apparatus, the sheets on which the figures of the wiring diagram are respectively located, should be arranged serially and in end-to-end relation with Fig. 23*a* at the top. As stated hereinabove, the operation can best be understood by reference to a specific example. Consequently, in the following description, specific reference will be made to the two record cards DC–1 and DC–2 of Figs. 10 and 11, respectively, on which selected data has been recorded in the 12-unit code shown in its entirety in Fig. 9, and also to the particular skip bar 50 shown in Fig. 12, and to the plugboard connections shown in Fig. 22, and to the tape 201 of Fig. 21 wherein data contained in the record cards DC–1 and DC–2 have been recorded as code designations 202 in the 6-unit code shown in Fig. 20.

For the purposes of this description, it is assumed that the power switch 300 (Figs. 1 and 23*a*) is now open, that the record cards are properly arranged and in place in the card magazine 120 with the bottom card being the card DC–1 of Fig. 10 and the next to the bottom card being the card DC–2 of Fig. 11, and that there is no record card now in place in the card carriage. It will be assumed that the card carriage 21 is in a column reading position, other than the 80th or last column position. A supply of blank tape 201 is placed in the tape punch 200 and the leading end thereof properly inserted in position with the tape-feed sprocket 253 engaging the tape and with the gate 257 clamped in position on the tape.

It will be assumed that the skip bar 50 of Fig. 12 is in place in the reading unit and that plug connections have been made as disclosed in Fig. 22. As shown therein, these plug connections are as follows: a plug connector 172 extends from the outlet plughub 167 of the reading strip for column reading position #7 to the inlet skip hub 198 (see also Figs. 23*a* and 23*g*); a plug connector 173 extends from the outlet plughub 167 for column reading position #29 of the reading strip to the inlet plughub 182 (see also Figs. 23*a* and 23*b*) which, as stated previously, is permanently connected to the punch control relay R97 (Fig. 23*f*) for effecting the punching of the code designation representing the period (.) or decimal point; a plug connector 174 extends from the outlet plughub 167 for column reading position #58 of the reading strip to the inlet hub 197 (see also Figs. 23*a* and 23*g*) controlling a release or carriage return operation; a plug connector 175 of the split type includes one branch 175*a* which extends from the outlet plughub 191 of the translator, also identified as "11," to the inlet hub 186 (see also Fig. 23*b*) which, as previously stated, is permanently connected to the punch control relay R101 (Fig. 23*f*) for effecting the punching of the code designation representing a skipping or tabular operation of the card carriage; and the other branch 175b of connector 175 connects the outlet plughub 191 of the translator with the inlet hub 199 (see also Fig. 23g) controlling a skipping operation of the card sensing unit 20; a plug connector 176 extends from the outlet hub 194 of the translator, also identified as "12," to the inlet plughub 187 (see also Fig. 23b) which is permanently connected with the punch control relay 102 (Fig. 23f) which effects the punching of the code designation representing the dollar mark ($); and a plug connector 177 extends from the outlet hub 190 of the translator, also identified as "0–11," to the inlet hub 181 (see also Fig. 23b) which is connected permanently to the punch control relay R96 (Fig. 23f) for effecting the punching of the code designation representing a carriage return or release operation. As will presently appear, the energizing of relay R96 also effects the carriage return or release operation of the card sensing unit 20.

In Figs. 23a to 23g of the drawings, all relays and magnets and the contacts controlled thereby, are shown in the position occupied with the electric power cut off. The operation of the apparatus is initiated by manually closing the power switch 300 (Fig. 23a) which connects the apparatus with a suitable source of electric power, for example, a direct current line of suitable voltage, and also by manually closing the switch 301 for connecting the drive motor 285 of the tape punch across the power source. The main positive conductor is indicated at 302 and extends at the left side and lengthwise of all of the sheets of the diagram, and the main negative conductor is indicated at 303 and extends at the right side and lengthwise of the sheets.

With no record card in the card carriage 21 and with the latter at rest, the closing of the power switch 300 will energize the reading brush control relay R5 (Fig. 23a), because, at this time, the reading brush magnet 92 is deenergized and its contacts 95 are in their closed position. With relay R5 energized, its interlock contacts R5a are opened and its interlock contacts R5b (Fig. 23g) are closed.

Figure 23F:
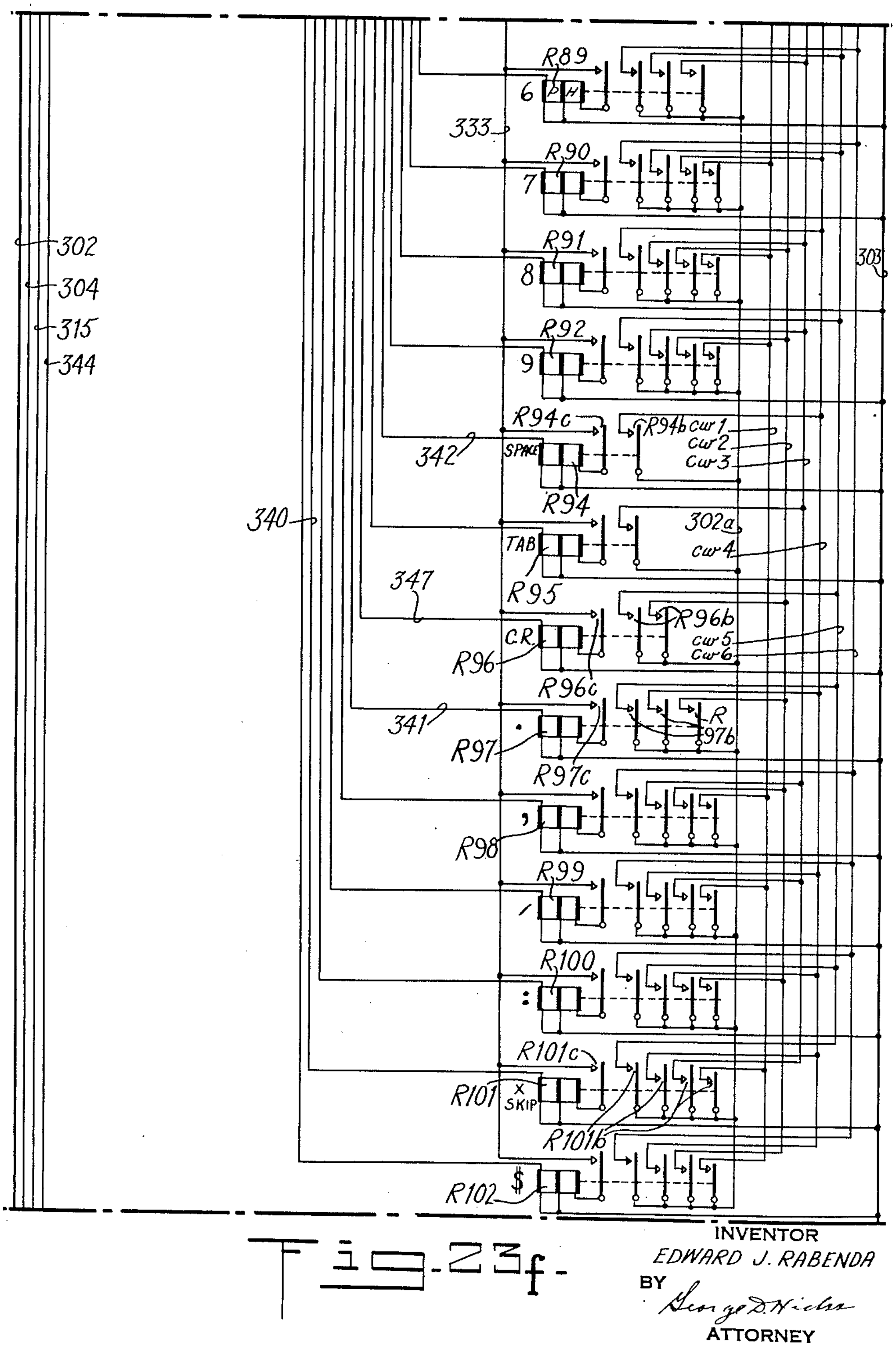
Figure 23G:
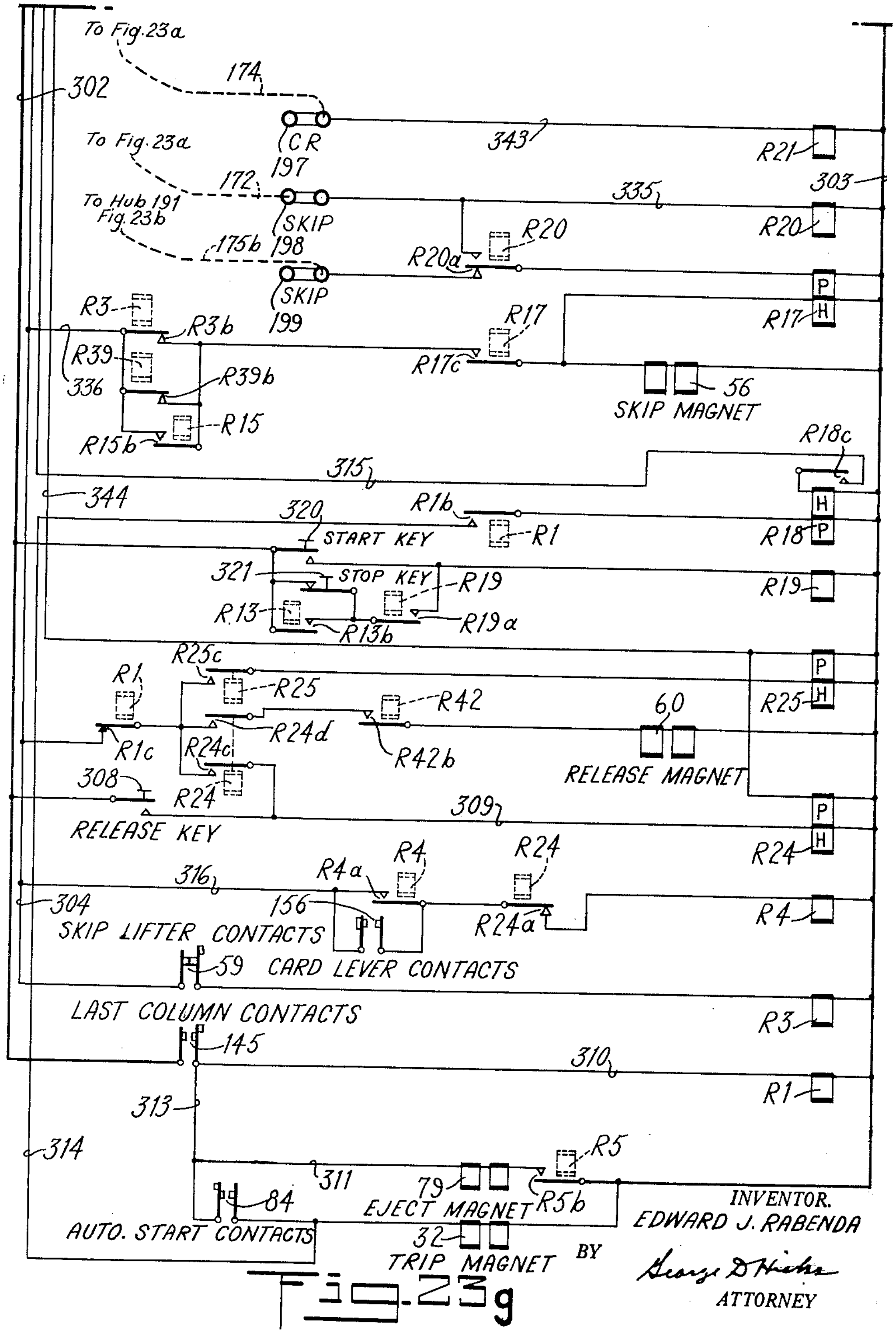

The closing of the power switch 300 also energizes the skip lifter control relay R3 (Fig. 23g) because the skip lifter contacts 59 are in their normally closed position with the card carriage at rest. The energizing circuit for the relay R3 extends from the positive conductor 302 through the normally closed latch contacts 35 (Fig. 23a), a conductor 304, contacts 59 (Fig. 23g), and the coil of relay R3 to the negative conductor 303. When thus energized, relay R3 closes its contacts R3a (Fig. 23a) and opens its contacts R3b (Fig. 23g).

In addition to the foregoing, the closing of the main power switch 300 energizes a series chain of delay control relays R39 to R42 inclusive (Fig. 23a). The energizing circuit for this chain is as follows: from the positive conductor 302 through the normally closed latch contacts 35, the conductor 304, floating cam contacts 149 which are now closed as the card carriage is at rest, conductor 305, and the coil of relay R39 to the negative conductor 303. When thus energized, relay R39 closes its contacts R39a and thereby picks up relay R40; R40 then closes its contacts R40a to pick up relay R41, and relay R41 closes its contacts R41a to pick up R42. R42 opens its contacts R42a (Fig. 23a) and closes its contacts R42b (Fig. 23g). Thus, this delay control chain R39 to R42, inclusive, is serially energized with the closing of the main power switch 300 and remains energized until either the latch contacts 35 or the floating cam contacts 149 are opened. All relays of the chain R39 to R42, inclusive, are deenergized together with the opening of either contacts 35 or 149. The function of this delay control chain will appear hereinafter.

The closing of the power switch 300 also energizes a second series chain of delay control relays R44 to R48, inclusive (Fig. 23a), which, as will be explained more fully hereinafter, are for the purpose of delaying the beginning of the next card reading cycle after the card reading unit has gone through either a skipping or a carriage return operation. As relay R43 is normally deenergized and its contacts R43a closed, the closing of the power switch 300 will energize relay R44 through a circuit extending from the positive conductor 302, through a conductor 306, now closed contacts R43a, and coil of R44 to the negative conductor 303. R44 closes its contacts R44a to pick up R45, R45a close to pick up R46, R46a then pick up R47, and R47a pick up R48, which closes its contacts R48a which, as will presently appear, are in the circuit which includes the reading brushes 122. As will be apparent, when relay R43 becomes energized, its contacts R43a will be opened thereby and the relays R44 to R48 will then become deenergized in the same serial order as they were energized.

It is noted that the reading brush magnet 92 (Fig. 23a) is not energized with the closing of the power switch 300 and the relay contacts R3a, because relay contacts R4b in the energizing circuit for magnet 92 are open and remain open until relay R4 (Fig. 23g) is energized. R4 can not be energized until a record card is fed into the card carriage and thereby closes the card lever contacts 156. Also, the contacts R4c of relay R4 (Fig. 23a) which are in the reading brush circuit, remain open, as well as contacts R19b of the start relay R19 (Fig. 23g) which is also deenergized at this time.

As the card carriage is not in the last column position, the last column contacts 145 will be open and the last column relay R1 will not be energized with the closing of the main power switch. Therefore, the contacts of the relay R1 remain for the present in the respective positions thereof shown in the drawings.

*Initial card feeding cycle.*—The next step in the operation is to feed the lowermost record card DC–1 (Fig. 10) from the stack of cards in the magazine 120 (Fig. 1) into reading position within the card carriage 21 of the card reading unit 20. The initial feeding of the card DC–1 into the card carriage is effected by causing the apparatus to go through a release operation. This initial release operation is effected manually by depressing the release key 308 (Fig. 23g), which establishes an energizing circuit for the hold coil of relay R24. As shown, the latter circuit extends from positive conductor 302, through release key 308, conductor 309, hold coil of relay R24 to negative conductor 303. Relay R24 will then close its contacts R24c and R24d and open its contacts R24a. Contacts R24c establish a holding circuit for the hold coil of relay R24 which extends from the positive conductor 302, normally closed latch contacts 35 (Fig. 23a), the conductor 304, normally closed contacts R1c (Fig. 23g), the contacts R24c now closed, conductor 309, and the hold coil of relay R24 to the negative conductor 303. As explained above, contacts R42b were closed when the series relay chain R39 to R42, inclusive, (Fig. 23a) became energized with the closing of power switch 300. Hence, the closing of relay contacts R24d (Fig. 23g) establishes an energizing circuit for the release magnet 60. This latter circuit includes the same path as the hold circuit for relay R24 to the now closed contacts R1c and from there the circuit extends through contacts R24d, contacts R42b, now closed, and the release magnet 60 to the negative conductor 303. Now-open contacts R24a are interlock contacts which prevent the energizing of relay R4 while the card carriage is moving to the last column position.

As explained previously, when the release magnet 60 is energized, it moves the slide 66 to the right, as viewed in Fig. 2, and thereby raises the skip lifter 51 which, in turn, raises the escapement dog 47 (Fig. 6) from engagement with rack 15 and thereby permits uninterrupted movement of the card carriage 21 to the last column position where the last column contacts 145 are closed. The raising of the escapement dog 47 by the skip lifter 51 also opens the floating cam contacts 149 (see also Fig. 23a) which open the energizing circuits for all of the relays of the control relay chain R39 to R42, inclusive. The raising of the skip lifter 51 also opens the skip lifter contacts 59 to deenergize the relay R3 (Fig. 23g) which opens its contacts R3a (Fig. 23a) in the energizing circuit for the brush magnet 92 and also closes its contacts R3b (Fig. 23g), the purpose of which will be described later in connection with a different operation.

The deenergizing of the relay chain R39 to R42, inclusive, by the opening of the floating cam contacts 149, results in the opening of relay contacts R42b (Fig. 23g) which are in the energizing circuit for the release magnet 60. The purpose of the latter is to deenergize the magnet 60 before the card carriage reaches the last column position so that the slide bar 66 (Fig. 2) can be moved back to its normal position in the manner described hereinabove.

With the card carriage 21 moving to the last column position, the contacts 145 (Fig. 23g) are closed thereby and they energize relay R1 by a circuit extending from positive conductor 302 and through the contacts 145, conductor 310, and the coil of relay R1 to the negative conductor 303. R1 opens its contacts R1c in the energizing circuit for the hold coil of R24. The closing of contacts 145 also establishes an energizing circuit for the eject magnet 79. This circuit extends from the positive conductor through the last column contacts 145, the conductor 313, conductor 311, eject magnet 79, and contacts R5b to the negative conductor 303.

As described hereinabove, the energizing of the eject magnet 79 trips the card flipper mechanism (Fig. 3) and the latter, through projection 86 and lever 85, closes the auto-start contacts 84 (see also Fig. 23g). The now closed contacts 84 energize the trip magnet 32 through a circuit which is traced as follows: from the positive conductor 302, through the last column contacts 145, a conductor 313, contacts 84, and trip magnet 32 to the negative conductor 303. The energizing of the trip magnet 32 shifts the latch contacts 35, 36, and 36a (Figs. 2 and 23a) in the manner described hereinabove. The closed latch contacts 36 establish an energizing circuit for the drive motor 22 of the card reading unit 20 and the motor then operates to return the card carriage 21 to its #1 column reading position and simultaneously therewith to feed the bottom card DC-1 from the stack in the magazine 120 into the card carriage.

When relay R1 (Fig. 23g) was energized by the closing of the last column contacts 145, the contacts R1b were closed and they conditioned a pick up circuit for relay R18 which also includes the last-column contacts 145 and the auto-start contacts 84. This conditioned circuit extends from the contacts 84 through a conductor 314, the contacts R1b and the pick up coil of R18 to the negative conductor 303. Thus, when contacts 84 were closed, the relay R18 was energized and closed its hold contacts R18c and transferred its punch control contacts R18b (Fig. 23a). The transferred contacts R18b establish an energizing circuit for punch control relay R38 and relay R43. R38 opens its contacts R38c in the reading circuit. R43 opens its contacts R43a and thereby deenergizes the relay chain R44 to R48. The relay R18 is held energized, by a circuit including the negative conductor 303; its hold contacts R18c, now closed; a conductor 315; and parallel circuit paths extending from the conductor 315; to the positive conductor 302 which include, respectively, contacts R42a (Fig. 23a) and latch contacts 36a, which are both closed at this time. The function of relay R18 is to effect, through the relay R38, and as long as they are energized, a continuing series of successive operating cycles of the punch 200 and during each such operating cycle of the punch, a timing signal or code designation (Fig. 20) is punched, and the tape 201 is spaced. This will all be fully explained hereinafter in connection with the description of the release operations under the control of the reading strip and the record card.

As explained previously in the detail description of the card sensing unit 20, the latch contacts 35, 36, and 36a are returned to their respective normal positions shown in Figs. 2 and 23a as the card carriage reaches the #1 column reading position. The feeding of the bottom card DC-1 into the card carriage closes the card lever contacts 156 (Fig. 23g) and thereby establishes an energizing circuit for relay R4. This circuit extends from the positive conductor 302 through the now closed latch contacts 35 (Fig. 23a); the conductor 304; conductor 316 (Fig. 23g); the now closed card lever contacts 156; relay contacts R24a, now closed as R24 was dropped out by the opening of contacts R1c; and the coil of relay R4 to the negative conductor 303. R4 closes its hold contacts R4a which are connected in shunt with the card lever contacts 157 and thereby hold R4 energized as long as the latch contacts 35 and the relay contacts R24a remain in the position shown.

Relay R4 also closes its contacts R4b and R4c (Fig. 23a). As indicated previously, contacts R4b are in the energizing circuit for the reading brush magnet 92. Relay contacts R1a and R3a are also in this circuit. At this time, contacts R1a have returned to the position shown, as relay R1 dropped out with the opening of the last column contacts by movement of the card carriage from the last column position. Relay contacts R3a are also now closed because the skip lifter 51 returned to its normal position shown with the return of the slide 66 (Fig. 2) to its normal position, with the result that the skip lifter contacts 59 (Fig. 23g) reclosed to condition an energizing circuit for R3 which circuit was closed by the reclosing of latch contacts 35.

Thus, with the reclosing of latch contacts 35 and with the energizing of relays R3 and R4 as explained above, an energizing circuit is established for the reading brush magnet 92. As shown in Fig. 23*a*, this circuit extends from the positive conductor 302, through upper latch contacts 35, the conductor 304, contacts R1*a*, contacts R4*b*, contacts R3*a*, the coil of magnet 92, the cutout contacts 116 to the negative conductor 303. The energizing of the brush magnet 92 opens its contacts 95 to drop out the relay R5 and the latter then returns its contacts R5*a* to the position shown. The latch contacts 35, when they reclosed, also established an energizing circuit through the floating cam contacts 149 for the series relay chain R39 to R42, inclusive. As the latch contacts 36*a* are now open, R18 is dropped out by the opening of contacts R42*a*. R18*b* will then shift to deenergize R38 and R43. The contacts R43*a* then close to pick up the series chain of relays R44 to R48, inclusive. R48 will then close its contacts R48*a*. Relay contacts R38*c* also reclose. With the parts in this position, the apparatus is now ready to commence the successive reading of the code designations in the columns of the card DC–1 and to punch in the tape the corresponding code designations in the 6-unit code.

*Card reading and tape punching operation.*—A card reading operation is initiated by depressing the start key 320 which, as shown in Fig. 23*g*, will energize the start relay R19 by a circuit extending from positive conductor 302, through the key 320, and coil of relay R19 to negative conductor 303. R19 will close its hold contacts R19*a* to establish a hold circuit for relay R19 which includes the stop key 321. It is noted that timing relay contacts R13*b* are arranged in shunt with the stop key so that during that portion of each operating cycle when time relay R13 (Fig. 23*a*) is energized, the hold circuit for R19 can not be opened by depressing the stop key 321. The purpose of this is to assure the completion of each cycle of operation after it has once begun.

Start relay R19, when thus energized, closes its contacts R19*b* (Fig. 23*a*) and thereby completes a reading circuit for the #1 column of the card DC–1 now in sensing position; and, at the same time, establishes a timing circuit for energizing the first relay R13 of a series chain of timing relays R13 to R15 inclusive. As shown, the reading circuit extends from the positive conductor 302 through the upper latch contacts 35; the floating cam contacts 149; the relay contacts R4*c*, R5*a*, R19*b*, R38*c*, and R48*a*; and thence through the reading brush contact roll 91, the code hole in the #1 index point position of column #1 of the card DC–1 (see also Fig. 10); the translator relay R26 corresponding to the sensed hole; and through conductor 323 to the negative conductor 302. The timing relay circuit includes the same path as the sensing circuit from the positive conductor 302 through the relay contacts R48*a* and from there the timing circuit includes a conductor 324, the coil of relay R13, and a conductor 325 to the negative conductor 303. Thus, with the card DC–1 in the #1 column reading position, the closing of the start relay contacts R19*b* simultaneously energizes the translator relay R26 and the timing relay R13.

Translator relay R26 will then transfer its contacts R26*a* (Fig. 23*b*) and thereby condition an operating circuit for the punch control relay R84 (Fig. 23*e*) which, as will later appear, effects the punching in the tape of the code combination in the 6-position code which represents the numeral "1." The energizing of the timing relay R13, (Fig. 23*a*), as above explained, closes its contacts R13*a* to pick up timing relay R14 by a circuit extending from the positive conductor 302 and through the coil of R14 and conductor 325 to the negative conductor 303. R14 then closes its contacts R14*a* to pick up the timing relay R15.

With the energizing of timing relay R14, its operating control contacts R14*b* also close and thereby establish an operating circuit through the punch control relay 84 which, as just explained, was conditioned by the transferring of the translator contacts R26*a*. This operating circuit follows the same path as the reading and timing circuits through contacts R48*a* and also includes the conductor 324; the timing relay contacts R14*b*; skip interlock relay contacts R20*b*; the coil of relay R23; carriage return interlock relay contacts R21*b*; conductor 327; translator relay contacts R37*d* (Fig. 23*b*), in the position shown; translator relay contacts R36*b*, in the position shown; translator relay contacts R35*c*, in the position shown; translator relay contacts R26*a* now shifted; conductor 328 which extends through a cable 329; terminating in Fig. 23*e*, the pick up coil of punch control relay R84, and through a conductor 330 to the negative conductor 303.

The energizing of punch control relay R84 by the circuit just traced will result in the closing of its hold contacts R84*c* and its code selector contacts R84*b*. With the closing of timing relay contacts R15*a* (Fig. 23*a*), the hold circuit for the punch control relay R84 is established. This circuit extends from the positive conductor 302 through the contacts R15*a*, the conductor 332, the coil of relay R22 which controls the energizing of the punch clutch magnet CM, the conductor 333, contacts R84*c* (Fig. 23*e*), the hold coil of R84 and thence through the conductor 330 to the negative conductor 303.

The closing of the code contacts R84*b* (Fig. 23*e*) establishes an energizing circuit for the code selector magnet SM–1 (Fig. 23*a*) of the punch unit. This circuit extends from the positive conductor 302 through a conductor 302*a*, beginning in Fig. 23*a*, the code contacts R84*b* (Fig. 23*e*), the code selector wire CW–1, the selector magnet SM–1 (Fig. 23*a*), and the conductor 334 to the negative conductor 303. As explained hereinabove in the detail description of the punch unit, the energizing of the code selector magnet SM–1 operates a corresponding latch lever 234 (Fig. 14) to latch up the right hand end of the corresponding punch lever or interposer 226. As stated previously, the coil of relay R22 is in the holding circuit for the punch control magnet R84 which is closed by timing relay contacts R15*a* (Fig. 23*a*). Relay R22 will then shift its contacts R22*a* and thereby establish an energizing circuit for the clutch magnet CM of the punch. This circuit extends from the positive conductor 302, through the conductor 302*a*, the contacts R22*a*, the clutch magnet CM, and conductor 334 to the negative conductor 303. As described previously, the energizing of the clutch magnet CM effects a single revolution of the punch operating shaft 229, during which a code hole is punched in the #1 code position of the tape 201 and the tape is spaced forward one step.

The closing of timing relay contacts R15*a* also establishes an energizing circuit for the escape magnet 40 (Fig. 23*a*). This circuit extends from the positive conductor 302 through the relay contacts R15$a$, the escape magnet 40 and the conductor 325 to the negative conductor 303. As explained above, first the energizing and then the deenergizing of the escape magnet 40 effects the operation of the escape pawls 47 and 48 (Fig. 6) to permit the card carriage to skip to the next or #2 column reading position.

The raising of the pawl 47 by the energizing of the escape magnet 40 opens the floating cam contacts 149, and thereby opens the reading, timing, and operating circuits previously traced. The opening of the timing circuit will drop out relay R13 which will then open its contacts R13$a$ to drop out R14, and R14 will then open its contacts R14$a$ to drop out R15. Relay R15 will then open its contacts R15$a$ which open the energizing circuit for the escape magnet 40, and also open the holding circuit for the punch control relay R84, the latter circuit also including the coil of clutch magnet control relay R22. The deenergizing of the clutch magnet 40 will permit the lowering of escape dog 47 and thereby complete the escaping operation of the card carriage 21 and permit the floating cam contacts 149 to reclose and thereby initiate the next card reading cycle.

Thus, the escape magnet 40 is kept energized and the dog 47 is thereby kept in raised position to hold open the floating cam contacts 149 for a length of time required to drop out relays R13, R14, and R15 in series. The purpose of this is to assure the completion of the escape operation and the dropping out of all relays controlled thereby before the next reading cycle begins with the reclosing of floating cam contacts 149.

With the reclosing of the floating cam contacts 149, column #2 of record card DC–1 (Fig. 10) is read and the punch 200 operated, in the same manner as just described, to punch a code hole in the #2, #3, and #5 code positions in the tape 201 which, as shown in Figs. 20 and 21, represents the numeral "2." Also, in the same manner, columns #3, #4, #5, and #6 of the card DC–1 (Fig. 10) are read in succession and the code designations representing the numerals "3," "4," "5," and "6" are successively punched in the tape 201 by the unit 200.

*Skipping operation under the control of the reading strip.*—In accordance with the present invention, means are provided for causing the reading unit 20 to skip over predetermined columns of the card being read, under the control of the reading strip; and, for the entire length of time the unit 20 is going through such skipping operation, the punch 200 automatically goes through successive operating cycles and during each such operating cycle a timing signal is recorded in the tape 201 and the tape advanced the space of one record field. In so far as the present invention is concerned, the timing signal may be any selected code designation. In the embodiment disclosed, the timing signal has been arbitrarily selected as being a code hole in the #2 code position of the tape 201. In Fig. 20, this code designation is indicated by the legend "Timing." The timing signal selected is one which will not affect the operation of the machine (not shown) which will be operated under the control of the tape to manifest the coded data recorded therein. As another example of a timing signal which can be used, only a feed hole 203 need be punched in the tape, the rest of the recording field being left blank. In this art, a blank record field is sometimes used as a code designation.

As will be noted from an examination of Fig. 12, the skip bar 50 is provided with a high portion 50$b$ extending from column #7 to column #12, inclusive. It will also be noted, from an examination of Fig. 22, that the plug connector 172 connects the outlet plughub 167 of the reading strip for column #7 to the inlet plughub 198 for effecting a skipping operation. (See also Figs. 23$a$ and 23$g$ of the wiring diagram.)

Thus, when the card carriage 21 of the sensing unit 20 escapes to the column #7 reading position and as soon as the floating cam contacts 149 (Fig. 23$a$) close, a circuit is established through the reading strip for energizing the skip control relay R20 (Fig. 23$g$). This circuit is traced as follows: from the positive conductor 302 through the upper latch contacts 35 (Fig. 23$a$); the floating cam contacts 149; relay contacts R4$c$, R5$a$, R19$b$, R38$c$, and R48$a$, all in closed position; the conductor 324; the common contact insert 166 of the reading strip; contact blade 165$e$; contact blade 165$c$; contact 162 for the #7 column reading position; outlet plughub 167 of the plugboard 170 corresponding to such column reading position; connector 172, inlet plughub 198 (Fig. 23$g$); a conductor 335; and the coil of relay R20 to the negative conductor 303. Relay R20, when thus energized, will transfer its contacts R20$a$ (Fig. 23$g$) and open its interlock contacts R20$b$ (Fig. 23$a$). The interlock contacts R20$b$ are in the operating circuit for the punch control relays which also includes relay R23, and consequently contacts R20$b$ prevent such circuit from being established with the card carriage in position to read column #7 of the card DC–1. The transferred contacts R20$a$ connect one side of the pick up coil of relay R17 with the conductor 335, the other side of such coil being connected to the negative conductor 303. Thus, the pick up coil of R17 is energized and closes its contacts R17$c$ which condition an energizing circuit for the holding coil of R17; such holding circuit being closed when timing relay contacts R15$b$ close. Contacts R3$b$ and R39$b$, which are connected in shunt with R15$b$, are open at this time. This holding circuit is traced as follows: from the positive conductor 302, the upper latch contacts 35 (Fig. 23$a$), the conductor 304, a conductor 336 (Fig. 23$g$), timing relay contacts R15$b$ when closed, contacts R17$c$ now closed, and the hold coil of R17. As shown, this circuit just traced will also energize the skip magnet 56 as the latter is connected in parallel with the hold coil of R17. Thus, the skip magnet 56 is energized with the closing of timing contacts R15$b$ and simultaneously with the energizing of the escape magnet 40 as the latter is energized by the closing of the contacts R15$a$. As explained previously, the skip magnet 56 moves the skip lifter 51 (Fig. 7) over the top of the skip bar 50. As shown in Fig. 12, a high portion 50$b$ is provided in the bar 50 at the column reading position #7 where the carriage 21 now rests. As the skip lifter 51 (Fig. 7) is projected over the top of the skip bar 50, the cam surface 52 thereof engages the high portion 50$c$ and thereby raises the skip lifter upward to a point where it engages the escape dog 47 and lifts it out of engagement with the rack 15. The card carriage will then skip over subsequent column reading positions until it reaches column reading position #13 where a low point 50$a$ is provided in the bar 50. The skip lifter will then drop down to the surface 50$a$ and permit the escape pawl 47 to reengage the rack 15 and hold the card carriage at the column #13 position.

It is noted that the previously traced holding circuit for relay R17 is maintained after timing relay contacts R15b are opened and throughout the skipping operation by the contacts R3b and R39b (Fig. 23g). When the skip lifter is raised to lift the dog 47, it opens the contacts 59 (Fig. 23g) and thereby deenergizes the relay R3 which closes its contacts R3b and opens its contacts R3a (Fig. 23a). The dog 47 in being raised opens the floating cam contacts 149 which drop out R39 and R13. R39 will then permit its contacts R39b to close. When the carriage 21 stops at the column #13 reading position, the floating cam contacts 149 close again and thereby pick up R39 to R42 inclusive, and the contacts 59 also close again to energize R3. Thus, R39b and R3b will then open to deenergize R17 and the skip magnet 56.

It is also noted that during the skipping operation the reading brush magnet 92 (Fig. 23a) is deenergized by the opening of contacts R3a, the latter being closed again to establish the circuit through magnet 92 when the skip lifter contacts close and pick up R3.

When relay R17 is energized, as explained above, it also transfers its contacts R17a (Fig. 23a) and thereby establishes an energizing circuit for relays R38 and R43. This circuit is traced as follows: from the positive conductor 302, the conductor 306, conductor 337, contacts R17a in the shifted position, contacts R25b in the position shown, contacts R 8b in the position shown, relays R38 and R43 in parallel, and through the conductor 325 to the negative conductor 303. Relay R43 opens its contacts R43a and thereby deenergizes the first relay R44 of the delay control chain R44 to R48, inclusive and this results in the chain of relays being serially deenergized in the manner previously explained.

The energized relay R38 opens its interlock contacts R38c in the reading circuit and closes its contacts R38a and R38b. R38a and R38b establish, respectively, a circuit for energizing the punch selector magnet SM–2 and a circuit for energizing the clutch magnet CM. The energizing circuit for the punch selector magnet SM–2 extends from the positive conductor 302, through the conductor 302a, contacts R38a, contacts R22b and R23a in the position shown, code wire CW–2, selector magnet SM–2, and conductor 334 to the negative conductor 303. The energizing circuit for the clutch magnet CM extends from the positive conductor 302 through the conductor 302a, contacts R38b, the clutch magnet CM, and the conductor 334 to the negative conductor 303. From the previous description of the operation of the punch 200, it will be apparent that as long as the relay R38 is energized and keeps the contacts R38a and R38b closed, the punch 200 will continue to go through successive operating cycles and during each such cycle, the #2 code hole will be punched in the tape 201 and the tape spaced to bring the next recording field into position. As explained previously, the #2 code hole is selected herein as the timing signal or code designation which will have no effect on the operation of the data-manifesting machines (not shown) which are to be controlled by the tape. In the punching operation just described, wherein the clutch magnet CM is held energized during the entire skipping operation and the punch shaft 229 therefor operated at a fixed time rate, four such timing code designations (the #2 code hole) are punched in the tape (see Fig. 21).

It is noted that contacts R22b and R23a in the above traced energizing circuit for selector magnet SM–2 are closed throughout the skipping operation of the card carriage 21. Contacts R22a are closed because in the skipping operation being described, no punch control relays are energized to complete the circuit through R22. R23a are closed during the skipping operation just described because the open interlock contacts R20b prevent R23 from being energized.

With the deenergizing of relay R17, its contacts R17a (Fig. 23a) return to the position shown and thereby open the energizing circuit for relays R38 and R43. It is noted that the energizing circuit for relay R38 includes the holding coil thereof and that the pick up coil of R38 is short circuited by a wire 338. The pick up and holding coils of R38 are arranged in inductive relation. Consequently, when the energizing circuit for the holding coil of R38 is broken, an E. M. F. will be induced in its pick up coil which will result in its contacts R38a and R38b thereof being held closed and its interlock contacts R38c, in the reading circuit, being held open a short time after R17a shift back to their normal position. The reason why the relay R38 is so constructed that it will be slow in dropping out, will be fully explained hereinafter in connection with the description of the release operations.

The deenergizing of relay R43 by the shifting of R17a to their normal position will permit the contacts R43a to reclose and thereby serially energize again the chain of relays R44 to R48, inclusive. When R48 is energized, it will close again its contacts R48a in the reading circuit and thereby permit column #13 of card DC–1 to be read. It is noted that the time required for relays R44 to R48, inclusive to become serially energized, upon the reclosing of contacts R43a, provides a time delay after the stopping of the punch and the skipping operation of all of the relays and contacts to return to their normal position before the establishing of the reading, timing, and operating circuits.

*Skipping operation under the control of a code designation in the card.*—In accordance with the present invention, provision is also made in the preferred embodiment disclosed herein to effect a skipping operation of the card carriage under the control of a code designation in the card; and, simultaneously with this operation of the card carriage, a code designation representing the skipping operation is punched in the tape 201 and following the punching of the latter designation, the tape punch is operated continually to successively punch the timing signal or code designation while the card carriage is skipping from one card reading position to another card reading position.

The card carriage is now in position to read column #13 of the record card DC–1. As shown in Fig. 10, the record card DC–1 contains a code hole in the #11 index point position of its column #13. Thus, with the reclosing of the floating cam contacts 149 and relay contacts R38c and R48a, as previously described, a reading circuit is established through the translator relay R36 (Fig. 23a) which corresponds to the #11 index point position. R36 then transfers its contacts R36b (Fig. 23b) and thereby conditions an operating circuit path through the translator network and including the outlet plughub 191. As stated hereinabove, the plug connector 175a connects the outlet plughub 191 with the inlet hub 186 and the latter is connected permanently by a wire 340, extending through cable 329, with the punch control relay R101 (Fig. 23f). The plug connector 175b connects outlet plughub 191 of the translator with the skip control inlet hub 199 (Fig. 23g). Thus, when the timing relay contacts R14b close, this conditioned operating circuit through the translator will energize simultaneously the punch control relay R101 (Fig. 23f) and the pick up coil of skip control relay R17.

It is noted that the coil of relay R23 is also in the operating circuit closed by R14b. R23 will then open its interlock contacts R23a in the punch control circuit controlled by R38a and including the code wire CW–2 and the selector magnet SM–2. Thus, as long as R14b is closed, R23 remains energized and the magnet SM–2 can not be energized by the closing of contacts R38a.

When relay R101 is energized by the closing of R14b, it closes its hold contacts R101c and its code selector contacts R101b. As shown, the code selector contacts R101b close code selector circuits including, respectively, the code selector wires CW–1, CW–3, CW–4, and CW–5, and also the code selector magnets SM–1, SM–3, SM–4, and SM–5, respectively. Thus, the last-named punch selector magnets are energized by the closing of contacts R101b. The hold circuit through R101c is established by the closing of timing relay contacts R15a (Fig. 23a) and this hold circuit also includes the relay R22. R22 closes its punch control contacts R22a and opens its interlock contacts R22b, the latter being also in the circuit path between R38a and the code wire CW–2. Contacts R22a establish an energizing circuit for the clutch magnet CM which extends from the positive conductor 302, through 302a, contacts R22a, the magnet CM, and conductor 334 to the negative conductor 303. This circuit through the clutch magnet remains closed as long as R15a holds R22 energized. In the manner explained above, the punch 200 will then go through a cycle of operation during which the 1—3—4—5 code designation will be punched in the tape 201. From an examination of Figs. 20 and 21, it will be noted that this code designation represents a skip operation.

As stated above, the pick up coil of R17 (Fig. 23g) is energized simultaneously with the punch control relay R101. Relay R17 will then close its hold contacts R17c to establish through contacts R15b and the normally closed latch contacts 35 (Fig. 23a), an energizing circuit for the hold coil of relay R17 and an energizing circuit for the skip magnet 56. The latter circuit is established and held in the same manner as described previously in connection with a skip operation under the control of the reading strip.

The skip magnet 56 will then project the skip lifter 51 over the low point 50a of the skip bar 50 at the column #13 reading position (Fig. 12). This will not affect, at this moment, the condition of the card carriage; because, as explained previously, the skip lifter 51 is not raised high enough to engage the escape dog 47 when the lifter engages a low point 50a in the skip bar.

When timing relay contacts R15a close to energize the escape magnet 40 and then open to deenergize the magnet 40, the card carriage 21 will escape to the next card reading position in the manner previously explained. As the card carriage escapes to the next column reading position, the skip lifter 51 will first engage an inclined surface 50c and then a high point 50b on the skip bar 50 which will result in the card carriage automatically skipping to column reading position #20 where the skip lifter 51 is lowered by engaging a low point 50a of the skip bar 50 and thereby permits the escape dog 47 to again engage the rack 15 and thereby stop the card carriage.

When the escape dog 47 was raised by the action of the escape magnet 40, the floating cam contacts 149 were opened which, in turn opened the circuit to R13 and R39, as before explained. Thus, R39 closed its contacts R39b (Fig. 23g) to hold the circuit through R17 throughout the skipping operation. When the skip lifter 51 was raised by the high point 50b of bar 50 in approaching column reading position #14, it opened its contacts 59 (Fig. 23g) and thereby dropped out the relay R3 which closed its contacts R3b to also hold R17 energized during the skipping operation. R3 also opened its contacts R3a (Fig. 23a) to drop out the reading brush magnet 92 during the skipping operation.

R17, when energized, also transferred its contacts R17a (Fig. 23a) and thereby established the energizing circuit for the punch control relay R38 and the relay R43. R38 closed its contacts R38a and R38b. R43 opens its contacts R43a to drop out in series the relay chain R44 to R48, inclusive.

The closing of contacts R38b serves to hold energized the clutch magnet CM which is at this point already energized by the previous closing of contacts R22a, the latter effecting the punch operating cycle described above wherein the skip code designation is recorded in the tape. As explained above, the contacts R38a are in the circuit path to the code wire CW–2; but, the closing of the contacts R38a does not establish the latter circuit during the punch operating cycle wherein the skip code designation is punched, because contacts R22b and R23a are then open.

When timing relay contacts R14b and R15a reopen at the termination of the cycle during which the column #13 of the card DC–1 is read, relays R22 and R23 will be deenergized, thereby permitting the contacts R22b and R23a to reclose and establish through R38a the energizing circuit for the code selector magnet SM–2. The punch then will go through a series of recurring operating cycles during each of which the timing code designation (the #2 code hole) will be punched in the tape and the tape will be spaced in the same manner as explained previously. The timing of the parts of the apparatus disclosed herein is such that the skip code designation is punched in the tape and then on the next operating cycle of the punch, the #2 code hole, or timing designation, is punched in the tape. As shown in Fig. 21, four such timing designations are punched in the tape following the skip code designation and while the skipping operation is taking place.

At the end of the skipping operation which, as stated, occurs when column reading position #20 is reached and the skip lifter is again lowered to permit the pawl 47 to reengage the rack 15, the skip lifter contacts 59 (Fig. 23g) reclose and thereby energize again the relay R3 which opens its contacts R3b in the energizing circuit for relay R17 and the skip magnet 56, and recloses its contacts R3a (Fig. 23a) in the energizing circuit for the brush magnet 92. The lowering of the skip lifter 51 at column position #20 also permits the floating cam contacts 149 to reclose, which will energize again the series chain of relays R39 to R42, inclusive. R39 will open its contacts R39b (Fig. 23g) which are also in the energizing circuit for relay R17 and the skip magnet 56.

With the card carriage at the column reading position #20 and with the deenergizing of relay R17, its contacts R17a open the energizing circuit for relays R38 and R43. As explained, R38 is a slow acting relay so that its contacts R38a and R38b open to stop the operation of the punch a short time after the contacts R17a break the circuit through R38. Contacts R38c in the reading circuit then reclose. R43 closes its contacts R43a and thereby permits the serial energizing of the delay control relay chain R44 to R48, inclusive. When R48 is energized, it recloses its interlock contacts R48a in the reading circuit and the apparatus is thereby restored to its normal operating condition. As explained, the delay control chain R44 to R48, inclusive, through the contacts R48a, provide a definite delay after a skipping operation so as to assure that all instrumentalities and parts of the apparatus are restored to their normal operating conditions before the next reading cycle begins.

With the closing of contacts R38c and R48a, the next reading circuit is established through column #20 of the card DC-1 (Fig. 10) with the result that the code hole in the #0 index point position is read and the corresponding code designation in the 6-position code (see Fig. 21) is punched in the tape 201 in the same manner as previously described. In the same manner, columns #21 to #28, inclusive of the card DC-1 are successively read and corresponding code designations are punched in the tape 201 as shown in Fig. 21.

*Punching under control of the reading strip.*—In accordance with the present invention, provision is also made for controlling the operation of the punch by the reading strip. This is exemplified in the operating example being described by a code designation representing the period or decimal point (.) following the recording of the 1—2—4—5 code designation in the tape in response to the reading of column #28 of the card. As explained above, a plug connector 173 extends from the outlet hub 167 of the reading strip for column #29 (Figs. 22 and 23a) to the inlet hub 182 (see also Fig. 23b) which is connected by a permanent wire 341 immediately and closes its hold contacts R97c (Fig. 23f). Thus, with the closing of the floating cam contacts 149, and with the card carriage at column reading position #29, R97 is energized immediately and closes its hold contacts R97c, and its code selector contacts R97b. Contacts R97b energize selector magnets SM-2, SM-4, and SM-5 through code wires CW-2, CW-4, and CW-5, respectively, as before explained; and, with the closing of timing relay contacts R15a and the energizing of relay R22, its contacts R22a are closed to energize the clutch magnet CM, and thereby effect a cycle of operation of the punch 200, during which the 2—4—5 code designation representing the decimal point in the 6-position code, is punched in the tape 201 (see Fig. 21).

It is noted that column #29 of the card DC-1 (Fig. 10) does not contain any code hole and that, as in sensing this column none of the translator relays are energized, the translator network of Fig. 23b remains in the position shown and the operating circuit path through the translator terminates in a wire 342 which is connected to the normally closed points of relay contacts R34a. The wire 342 is connected through the cable 329 with punch control relay R94 (Fig. 23f). Thus, with the card carriage at column #29, relay R94 will also be energized with the closing of timing relay contacts R14b and will close its hold contacts R94c and its code selector contacts R94b. This, however, will not affect the above described punching in the tape of the code designation representing the decimal point, because the code selector contacts R94b are only connected to the code wire CW-4, which is connected to selector magnet SM-4, and the latter magnet has already been energized by the now closed code selector contacts R97b. From this, it will also be apparent that in column reading positions where the reading strip is not plugged to a punch control relay, the sensing of a blank column in the record card will effect the punching of the #4 hole in the tape, which, as shown in Fig. 20, is the "space" code designation.

After the just described punching of the 2—4—5 code designation in the tape 201 under the control of the reading strip, columns #30 to #57, inclusive of the card DC-1 (Fig. 10) are read in succession, and the code designations in the 6-position code corresponding, respectively, to those recorded in these card columns, are punched in the tape 201 (see also Fig. 21). This operation will be apparent from the foregoing description.

*Release operation under the control of the reading strip.*—In accordance with the present invention, provision is also made for effecting a release operation under the control of the reading strip at any selected column reading position of the card carriage. The release operation under the control of the reading strip is to a certain extent similar to the operations effected during the previously described initial card feeding cycle wherein a release operation was initiated by the depressing of release key 308. That is, the release operation now to be described comprises moving the card carriage 21 automatically from the column reading position #58, where it now rests, to the last column reading position; ejecting the card DC-1 from the carriage; and then returning the carriage to the #1 column reading position and simultaneously therewith feeding the next record card DC-2 (Fig. 11) from the magazine 120 (Fig. 1) into proper position in the card carriage 21. It is also noted that throughout this release operation and until the new card DC-2 is in position in the card carriage 21 with the column #1 thereof in position to be read, the punch 200 operates continually to punch successive timing signals or code designations (the #2 code hole) in the tape 201. As previously described, the punch shaft 229 operates at a fixed time rate throughout this operation, and consequently the number of timing designations in the tape will be a measure of the time required for the release and card feeding operation, with the result that when the tape is used later to control a machine (not shown) for manifesting the designations recorded therein, such machine will have time to go through an operation corresponding to, or the same as, such release operation, while the tape reading means (not shown) is successively sensing the timing designations in the tape 201. As explained previously, the sensing of such timing designations will have no control effect on the operation of a data-manifesting machine of the type indicated.

As noted hereinabove, hub 167 of the reading strip which corresponds to column reading position #58 of the card carriage, is connected by a plug connector 174 with the inlet hub 197 (see Figs. 22, 23*a*, and 23*g*). Thus, with the escape of the card carriage 21 to its column reading position #58, an energizing circuit for relay R21 (Fig. 23*g*) is immediately established upon the closing of the floating cam contacts 149 (Fig. 23*a*). This circuit is traced as follows: from the positive conductor 302; through the normally closed latch contacts 35 (Fig. 23*a*); the conductor 304; floating cam contacts 149, now closed; the relay contacts R4*c*, R5*a*, R19*b*, R38*c*, and R48*a*, all in closed position; the conductor 324; the common contact 166 of the reading strip; contact blades 165*e* and 165*b* (Fig. 8); the contact insert 162 corresponding to column position #58 (Fig. 23*a*) the plughub 167 corresponding to such column reading position; the plug connector 174; the inlet hub 197 (Fig. 23*g*); a conductor 343; and the coil of relay R21 to the negative conductor 303.

Relay R21, when thus energized, opens its interlock contacts R21*b* (Fig. 23*a*) in the previously traced operating circuit, which will prevent the establishing of this circuit with the card at column reading position #58. R21 also closes its contacts R21*a* (Fig. 23*a*) to establish an energizing circuit for the punch control relay R38 (Fig. 23*a*) and the delay control relay R43, and an energizing circuit for the release control relay R24 (Fig. 23*g*) and the punch control relay R25.

The energizing circuit for relays R38 and R43 (Fig. 23*a*) extends from the positive conductor 302, through conductor 306; the contacts R21*a*, now closed; contacts R17*a*, R25*b*, and R18*b*, all in the position shown; and through the coils of R38 and R43 in parallel to the conductor 325 and the negative conductor 303. Thus, relay R38 closes its punch control contacts R38*a* and R38*b* and thereby effects continual cycling operations of the punch wherein during each such operating cycle, the #2 code hole is punched in the tape 201 and the tape is spaced in the same manner as previously described in connection with the skipping operation. When thus energized, the relay R43 opens its contacts R43*a* and thereby drops out the delay control relay chain R44 to R48 inclusive, as previously described.

The above-mentioned energizing circuit for relays R24 and R25 is traced as follows: from the positive conductor 302; the conductor 306 (Fig. 23*a*); the contacts R21*a*, now closed; a conductor 344; and the pick up coils of relays R24 and R25 (Fig. 23*g*) in parallel to the negative conductor 303.

Relay R25 closes its hold contacts R25*c* (Fig. 23*g*) to energize its hold coil by a circuit extending through the normally closed latch contacts 35 (Fig. 23*a*), the conductor 304, normally closed relay contacts R1*c*, the contacts R25*c*, now closed, and the hold coil of R25 to the negative conductor 303. Thus, as long as relay contacts R1*c* and the latch contacts 35 remain closed, the hold coil of R25 is kept energized. R25 transfers its contacts R25*b* (Fig. 23*a*) to take over the control of the energizing circuit for relays R38 and R43 from the contacts R21*a*. The energizing circuit for R38 and R43 then extends from the positive conductor 302 through the conductor 306, a conductor 345, the transferred contacts R25*b*, and through relays R38 and R43 to the negative conductor. As explained previously, the relay R38 is constructed so that it does not drop out until a slight delay after its energizing circuit is broken. Thus, the latter relay is kept energized while the contacts R25*b* transfer to break the circuit through R21*a* and establish the last traced circuit and consequently there is no interruption in the cyclic operations of the punch.

The relay R24, when energized by the closing of the contacts R21*a*, closes its hold contacts R24*c* to establish an energizing circuit for its hold coil which, as described hereinabove in connection with the initial card feeding operation, includes the normally closed relay contacts R1*c*, and the normally closed latch contacts 35. R24 opens its contacts R24*a* in the energizing circuit for the interlock relay R4 (Fig. 23*g*). R4 then opens its contacts R4*b* (Fig. 23*a*) in the energizing circuit for the reading brush magnet 92 and opens its contacts R4*c* in the card reading circuit. The magnet 92 then drops out and closes its contacts 95 to pick up R5 and the latter opens its contacts R5*a* in the reading circuit and closes its contacts R5*b* (Fig. 23*g*) in the energizing circuit for the eject magnet 79.

The relay R24 also closes its contacts R24*d* and thereby establishes the previously traced energizing circuit through the release magnet 60 which includes the relay contacts R1*c* and the latch contacts 35 (Fig. 23*a*). It is noted that at this time the contacts R42*d* are closed, as the floating cam contacts 149 are closed with the card carriage at the column #58 reading position and consequently the relay chain R39 to R42, inclusive, (Fig. 23*a*) are energized.

As explained hereinabove in connection with the initial card feeding cycle, when the release magnet 60 is energized, it moves the slide 66 to the right as viewed in Fig. 2, and the left-hand end thereof is cammed upward by its inclined under face 67, so that the end of the skip lifter 51 (Fig. 7) is lifted to raise the dog 47 out of engagement with the rack 15. This also opens both the skip lifter contacts 59 to drop out R3 and the floating cam contacts 149 to drop out R21 and R39 to R42, inclusive. R42*b* then open to deenergize the release magnet 60, but the slide 66 remains in its actuated position until the carriage reaches the last column position, as explained previously. The card carriage escapes to the 80th or last column position where the contacts 145 (Fig. 23*g*) are closed to establish the previously traced energizing circuits for the eject magnet 79 and the relay R1. The magnet 79 then effects operation of the eject mechanism to move the card DC–1 from the carriage 21 into the pocket 78 (Figs. 1 and 3); and, in so doing, closes the auto-start contacts 84 (Fig. 23*g*) to energize the trip magnet 32 which actuates the clutch mechanism 28 (Fig. 4) and shifts the latch contacts 35, 36, and 36*a* (Figs. 2 and 23*a*), so that the motor 22 is energized and the card carriage 21 is returned to its #1 column reading position and simultaneously therewith the new card DC–2 is fed into sensing position within the carriage 21.

As also explained previously in the description of the initial card feed cycle, the relay R1 (Fig. 23*g*), when energized with the closing of the last column contacts 145, closes its contacts R1*b* to condition an energizing circuit for the pick-up coil of relay R18, and opens its contacts R1*c* in the previously traced hold circuit for the relays R25 and R24 which then return their respective contacts to the positions shown in the drawings. The circuit for energizing the pick up coil of R18 is established with the closing of the auto-start contacts 84 which, as explained, occurs as the eject mechanism flips the card DC–1 into the pocket 78. R18 then transfers its contacts R18*b* (Fig. 23*a*) which, as shown, will take over the control of the energizing circuit for relays R38 and R43 from the contacts R25*b*.

It is apparent that there is a definite time interval between the transferring of the contacts R25*b* (Fig. 23*a*) in the energizing circuit for the punch control relay R38 and the re-establishing of the energizing circuit for R38 by the closing of contacts R18*b*. R25 is dropped out by the opening of R1*c* and R18 is not energized until the auto start contacts 84 close which does not occur until the eject mechanism has transferred the card DC–1 to the pocket 78. R1 and the eject magnet 79 are energized at the same time. It is noted, however, that although there is this definite time interval, the punch control contacts R38*a* and R38*b* do not open to interrupt the continual cyclic operations of the punch. This is due to the particular characteristics of the punch control relay R38. The pick up and hold coils of R38 are in inductive relationship and the pick up coil is shorted by the wire 338. Thus, when the circuit for the hold coil is broken, an E. M. F. is induced in the pick up coil sufficient to keep the flux from immediately collapsing and opening the contacts R38*a* and R38*b*. The flux will dissipate in time and permit the opening of the contacts; but, in the operation described, the time required to dissipate the flux sufficient to open the contacts is greater than the time interval between the opening of the circuit by R25*b* and the re-establishing of the circuit by R18*b*.

When R18 is energized, it also closes its hold contacts R18*c* (Fig. 23*g*) and thereby establishes the previously traced energizing circuit for its hold coil which circuit includes the latch contacts 36*a* (Fig. 23*a*) and the relay contacts R42*a* connected in parallel. As the pick up coil of R18 and the trip magnet 32 are both energized by the closing of the auto start contacts 84, the latch contacts 36*a* will be shifted by the trip magnet to establish the hold circuit for R18 before the auto start contacts open to break the pick up circuit.

As explained, the latch contacts 35, 36, and 36*a* remain in their shifted position while the card carriage 21 is being returned to its #1 column reading position and the new card DC–2 is being fed into position in the carriage, and the latch contacts are returned to their normal position shown as the card carriage arrives at its #1 column reading position. As the latch contacts 35 are open while the card carriage is being returned to the #1 column position, relays R39 to R42, inclusive are deenergized and the contacts R42*a* are closed. Thus, during this part of the operation, the hold circuit for R18 is maintained through both R42*a* and the shifted latch contacts 36*a*. When the latch contacts 36*a* are returned to their normal position shown, as the card carriage reaches the #1 column sensing position, the hold circuit for R18 will be maintained through the contacts R42*a* until the latch contacts 35 reclose and the relays of the chain R39 to R42, inclusive are picked up in series, at which time the contacts R42*a* will open and break the hold circuit for R18. This provides a definite time delay between the return of the latch contacts to their normal position and the breaking of the energizing circuit for the punch control relay R38. During this time delay, the punch will continue to operate. Also, after the circuit for R38 is broken, the previously described delay dropout characteristics of R38 will keep the contacts R38*a* and R38*b* closed until the flux is dissipated and during such time the punch will continue to operate and provide the timing signals in the tape 201. The contacts R38*c* in the card reading circuit will close with the opening of R38*a* and R38*b* to stop the punch.

The energizing circuit for R43 is also broken by the shifting of contacts R18*b*. R43*a* will then close and the relays of the delay control chain R44 to R48, inclusive will be serially energized, as explained previously. R48 will then reclose its contacts R48*a* and thereby establish the card reading circuit with the card DC–2 in the position to have its #1 record column sensed.

As explained above in the description of the initial card feeding cycle, the card lever contacts 156 (Fig. 23*g*) are closed as the new record card (DC–2) moves into sensing position in the card carriage and thereby energize the interlock relay R4 which closes its hold contacts R4*a* and its contacts R4*b* (Fig. 23*a*) in the brush magnet circuit and also its contacts R4*c* in the card reading circuit. The brush magnet contacts 95 open as the magnet 92 is energized and thereby deenergizes R5 which recloses its contacts R5*a* in the reading circuit. It is noted that the delay control chain R44 to R48 through the contacts R48*a* provides enough delay after the card carriage 21 has reached the #1 column reading position with the card DC–2 therein, to permit the various described operations to be completed and the contacts adjusted back to their normal operating position before the next reading circuit is established.

From the foregoing, it will be apparent that from the moment R21 is energized by the closing of the floating cam contacts at the column #58 reading position for card DC–1, and throughout the subsequent movement of the card carriage to the 80th column and the card ejecting operation, and during the return of the card carriage to the #1 column reading position and the feeding of the new card DC–2 into the carriage, the punch 200 continually operates to punch successively the timing perforations in the tape 201. It will be noted that in Fig. 21, twelve (12) such timing perforations are shown as having been punched in the tape 201 while the card reading unit was going through this operation.

*Reading card DC–2*.—The data designations in the record columns of card DC–2 (Fig. 11) are now read step-by-step and the corresponding code designations in the 6-position code are punched in the same manner as described above in connection with the card DC–1; with the exception that as a code hole is not present in the #11 index point position of column #13 of the card DC–2, the following columns #14 to #19, inclusive, will not be skipped over and they will be sensed in the normal manner and the punch operated in response thereto. Also, as the alphabetic data in card DC–2 only occupies twelve of the card columns allotted to the record field which is entitled "Description," provision is made herein for effecting a release operation under the control of a carriage return designation punched in column #44 which, as shown in Fig. 11, follows immediately the descriptive data. Such an arrangement obviously speeds up the operation of the apparatus for otherwise the unit 20 would have to sense each of the blank columns #44 to #57, inclusive, and the punch 200 operated to punch the space code designation in corresponding record columns of the tape.

*Release operation under the control of the carriage return code designation.*—With the closing of the floating cam contacts 149 after the card carriage 20 escapes to its column reading position #44, record column #44 of card DC-2 is sensed, and reading circuit paths are established through the code holes in the #11 and #0 index point positions, thereby energizing the corresponding translator relays R36 and R35, respectively. Relays R36 and R35 then shift their contacts in Fig. 23*b* and thereby condition an operating circuit path through the translator network in the same manner as described previously in connection with the sensing of other code designations. As shown in Fig. 23*b*, this circuit path includes the outlet plughub 190, also bearing the legend "0–11"; and, from the hub 190, the operating circuit extends through the plug connector 177, the inlet hub 191, a permanent conductor 347, and the pick up coil of punch control relay R96 (Fig. 23*f*) to the negative conductor 303. This conditioned operating circuit is closed with the closing of timing relay contacts R14*b* (Fig. 23*a*) with the result that the pick up coil of punch control relay R96 is energized and the latter then closes its hold contacts R96*c*, its code selector contacts R96*b*, and closes its release control contacts R96*a* (Fig. 23*a*).

In the manner explained previously, the closing of the code selector contacts R96*b* will establish a circuit including code wires CW-2 and CW-5 and the code selector magnets SM-2 and SM-5, respectively. The hold circuit for the hold coil of relay R96 is established with the closing of the timing relay contacts R15*a* Fig. 23*a*) and this hold circuit also includes the punch control relay R22. R22 will then close its contacts R22*a* which establish an energizing circuit path for the clutch magnet CM and thereby effect a cycle of operation of the punch during which the code punches corresponding to the previously energized selector magnets SM-2 and SM-5 are operated to punch the 2—5 code designation in the tape 201. As shown in Figs. 20 and 21, this designation represents the carriage return operation and is identified by the legend "C. R."

The closing of the contacts R96*a* (Fig. 23*a*) conditions an energizing circuit for the relays R25 and R24 (Fig. 23*g*) through wire 344, and the latter circuit is closed by the timing relay contacts R15*c*. This circuit is closed simultaneously with the energizing of the punch control relay R22 and the escape magnet 40 as the latter is effected by the closing of contacts R15*a*. As will be apparent, the closing of contacts R96*a* and R15*c* also establishes an energizing circuit for the punch control relay R38 and the relay R43 which controls the delay control chain R44 to R48, inclusive. R38 then closes its punch control contacts R38*a* and R38*b*. Although the latter contacts close at or slightly later than the contacts R22*a*, they will not interfere in any way with the operation of the punch to record the 2—5 or carriage return code designation in the tape 201, because the magnets SM-2 and SM-5 have already been energized by the closing of contacts R96*b* and the corresponding punches have been selected.

The energizing of the relays R25 and R24 (Fig. 23*g*) by the closing of contacts R96*a* and then contacts R15*c*, provides for effecting a release and card feeding operation of the apparatus, which takes place in the same manner as described above when these relays were energized by the closing of contacts R21*a* under the control of the reading strip. Consequently, a repetition of the description of this operation and its purpose is considered unnecessary at this point.

It is noted that the relays R96 and R22 are deenergized with the opening of timing relay contacts R15*a* and that relay R23 is deenergized with the opening of timing relay contacts R14*b*. The construction is such that the contacts R96*b* (Fig. 23*f*) open and contacts R22*b* and R23*a* (Fig. 23*g*) reclose before or at the end of the punch cycle when the 2—5 code designation is recorded. The result is that the selector magnet SM-2 is selected by R38*a* and the clutch magnet CM is kept energized by R38*b* so that the timing signal (the #2 hole) is punched in the tape on the next cycle and during each succeeding cycle until the release and card feed operation is completed all in the manner previously described.

It is also noted that thirteen timing signals are recorded in the tape 201 in Fig. 21 following the 2—5 code designation and that only twelve such signals were recorded in the previously described release operation. The reason for this is that in the last described release operation, the card carriage is released from the #44 column reading position and that in the previous operation the carriage is released from the #58 column reading position. In the last described operation, the punch has time to go through at least one additional operating cycle while the carriage is moving from column #44 to column #58.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In apparatus for recording in a sheet code designations representing data according to one code system and under the control of source records having record columns containing code designations therein representing such data according to a different code system, the combination of a carriage for holding a source record in sensing position; normal carriage spacing means for advancing the carriage and the record held thereby column-by-column past a sensing station; sensing means operable to sense the record columns of the source record as they are moved to the sensing station; release means operable, when activated, to remove a source record from said carriage and to feed a new source record into said carriage and to move said carriage to a position where the first column of the new record to be sensed is at the sensing station; a cyclically operable code recorder comprising a power element operating continually at a fixed time rate to determine operating cycles, a plurality of code recording elements selectively connectable for operation by said power element and operable when so connected to record data-representing code designations in a sheet and to space such sheet once for each recording operation, and so that one recording operation and one sheet spacing operation occur during one operating cycle; means responsive to the sensing of data-representing designations in the source record for selectively connecting said recording elements for operation by said power element so as to effect the recording of code designations in said sheet representing, respectively, the sensed data designations; means responsive to the advance of said carriage for activating said release means when a predetermined column of the source record held by said carriage is at the sensing station; special control means operated by said means responsive to the advance of said carriage and effective upon the activation of said release means for effecting operation of said code recorder to record timing designations in said sheet during successive operating cycles of said power element; and means effective upon the completion of the release operation for terminating operation of said special control means.

2. In apparatus for recording in a sheet code designations representing data according to one code system and under the control of source records having record columns containing code designations therein representing such data according to a different code system, the combination of a carriage for holding a source record in sensing position; normal sensing and spacing means for said source record operable to advance the carriage with the record held thereby column-by-column past a sensing station and to sense each record column at such station; release means operable, when activated, to remove a source record from said carriage and to feed a new source record into said carriage and to move said carriage to a position where the first column thereof to be sensed is at the sensing station; a cyclically operable code recorder comprising a power element operating continuously at a fixed time rate to determined operating cycles, a plurality of code recording elements selectively connectable for operation by said power element and operable when so connected to record data-representing code designations in a sheet and to space such sheet once for each recording operation and so that one recording operation and one sheet spacing operation occur during one operating cycle; means responsive to the sensing of data-representing designations in the source record for selectively connecting said recording elements for operation by said power element so as to effect recording of code designations representing, respectively, the sensed data designations; means operable when a predetermined record column of said source record is in sensing position for activating said release means; special control means effective upon the initiation of operation of said release means for effecting operation of said code recorder to record timing designations in said sheet during successive operating cycles of said power element; means effective upon a completion of operation of said release means for stopping operation of said special control means; and time delay means operated by said special control means when the recording of said timing designations has ceased for restoring operation of said normal sensing and spacing means upon the elapse of a predetermined interval of time after the new source record is in position to have its first column sensed.

3. In apparatus for recording in a sheet code designations representing data according to one code system and under the control of source records having record columns containing code designations therein representing such data according to a different code system, the combination of a carriage for holding a source record in sensing position; normal sensing and spacing means for said source record operable to advance the carriage with the record held thereby column-by-column past a sensing station and to sense each record column at such station; release means operable, when activated, to remove a source record from said carriage and to feed a new source record into said carriage and to move said carriage to a position where the first column thereof to be sensed is at the sensing station; a cyclically operable code recorder comprising a power element operating continuously at a fixed time rate to determine operating cycles, a plurality of code recording elements selectively connectable for operation by said power element and operable when so connected to record data-representing code designations in a sheet and to space such sheet once for each recording operation and so that one recording operation and one sheet spacing operation occur during one operating cycle; means responsive to the sensing of data-representing designations in the source record for selectively connecting said recording elements for operation by said power element so as to effect recording of code designations representing, respectively, the sensed data designations; means operable when a predetermined record column of said source record is in sensing position, for activating said release means; special control means effective upon the initiation of operation of said release means for stopping operation of said normal sensing and spacing means and for effecting operation of said code recorder to record timing designations in said sheet during successive operating cycles of said power element; means effective upon a completion of operation of said release means for stopping the recording of timing designations by said recorder; and time delay means for restoring operation of said normal sensing and spacing means upon the elapse of a predetermined interval of time after the completion of operation of the release means and the new source record is in position to have its first column sensed, said time delay means comprising electrical circuit means including a series chain of timing relays interconnected for successive operation in a prescribed serial order beginning with an initial relay of the chain and ending with a terminal relay of the chain, means controlled by said special control means for operating said initial relay upon a termination of the operation of said release means and when the recording of said timing designations has ceased, and means controlled by the operation of said terminal relay for restoring operation of said normal sensing and spacing means.

4. In apparatus for recording data in a sheet under the control of source records having record columns containing designations representing such data, the combination of a carriage for holding a source record in sensing position; normal sensing and spacing means for said source record operable to advance the carriage with the record held thereby column-by-column past a sensing station and to sense each record column at such station; multiple column spacing means operable to provide multiple column spacing movement of said carriage and to prevent operation of said normal sensing and spacing means during such multiple column spacing movement; recording means responsive to the sensing of data-representing designations in the source record for recording code designations representing such data in a sheet; means operable when a predetermined record column of said source record is in sensing position for effecting operation of said multiple column spacing means; and time delay means effective upon a completion of said multiple column spacing movement for restoring operation of said normal sensing and spacing means after a predetermined interval of time, said time delay means comprising electrical circuit means including a series chain of timing relays interconnected for successive operation in a prescribed serial order beginning with an initial relay of the chain and ending with a terminal relay of the chain, means operated by said multiple column spacing means for operating said initial relay upon a termination of the multiple column spacing movement of said carriage, and means controlled by said terminal relay for preventing the operation of said normal sensing and spacing means from being restored until said terminal relay is operated.

5. In apparatus for recording in a sheet code designations representing data according to one code system and under the control of source records having record columns containing code designations therein representing such data according to a different code system, the combination of a carriage for holding a source record in sensing position; normal sensing and spacing means for said source record operable to advance the carriage with the record held thereby column-by-column past a sensing station and to sense each record column at such station; release means operable, when activated, to remove a source record from said carriage and to feed a new source record into said carriage and to move said carriage to a position where the first column thereof to be sensed is at the sensing station; recording means responsive to the sensing of data-representing designations in the source record for recording code designations representing such data in a sheet; means operable when a predetermined record column of said source record is in sensing position for activating said release means; means effective upon the initiation of operation of said release means to stop operation of said normal sensing and spacing means; and time delay means operated by said release means and controlling said normal sensing and spacing means, said time delay means being effective upon a completion of operation of said release means for restoring operation of said normal sensing and spacing means upon the elapse of a predetermined interval of time after the new source record is in position to have its first column sensed.

6. In apparatus for recording in a sheet code designations representing data according to one code system and under the control of source records having record columns containing code designations therein representing such data according to a different code system, the combination of a carriage for holding a source record in sensing position; normal sensing and spacing means for said source record operable to advance the carriage with the record held thereby column-by-column past a sensing station and to sense each record column at such station; release means operable, when activated, to remove a source record from said carriage and to feed a new source record into said carriage and to move said carriage to a position where the first column thereof to be sensed is at the sensing station; recording means responsive to the sensing of data-representing designations in said source record for recording code designations representing such data in a sheet; means operable when a predetermined record column of said source record is in sensing position for activating said release means; means effective upon the initiation of operation of said release means, to stop operation of said normal sensing and spacing means; and time delay means effective upon a completion of operation of said release means for restoring operation of said normal sensing and spacing means upon the elapse of a predetermined interval of time after the new source record is in position to have its first column sensed, said time delay means comprising electrical circuit means including a series chain of timing relays inter-connected for successive operation in a prescribed serial order beginning with an initial relay of the chain and ending with a terminal relay of the chain, means operated by said release means for operating said initial relay upon a termination of the operation of said release means, and means controlled by said terminal relay for preventing the operation of said normal sensing and spacing means from being restored until said terminal relay is operated.

7. In apparatus for recording data in a sheet under the control of source records having record columns containing designations representing such data, the combination of a carriage for holding a source record in position to be sensed at a sensing station; normal record spacing means operable each time it is activated, to space the carriage a distance of one record column so as to move the record columns successively into sensing position; multiple column spacing means operable upon being activated to move the carriage a distance equal to a predetermined plural number of record columns; a normally closed main control switch; means for moving said switch to open position each time said carriage is being moved by said normal spacing means and said multiple column spacing means; time delay means comprising a pair of control contacts adjustable to first and second circuit conditions and normally occupying a first circuit condition and a series chain of timing relays interconnected for activation in a prescribed serial order upon adjustment of said control contacts to their said first circuit condition and said chain being deactivated upon said control contacts being adjusted to their said second circuit condition, the terminal relay of such chain to be activated including a pair of relay contacts moved to closed position upon activation of such terminal relay and moved to open position upon deactivation thereof; record sensing means operable to sense successively the record columns of the source record as the columns are moved to the sensing station and including means for activating said normal spacing means once for each column sensed, and said sensing means also comprising a plurality of electrical sensing elements at the sensing station, and an electrical circuit path including in series a source of power, said sensing elements, said main control switch, and said terminal relay contacts; recording means responsive to the sensing of the data designations for recording the corresponding data in a sheet; means operable when said carriage is at a certain column sensing position for activating said multiple column spacing means so as to space said carriage the predetermined plural number of columns; and means operated by said multiple column spacing means for adjusting said control contacts to their said second circuit condition upon the beginning of operation of said multiple column spacing means and for adjusting said control contacts to their said first circuit condition upon completion of operation of said multiple column spacing means.

8. In apparatus for recording data on a sheet under the control of data-representing designations contained in the record columns of a source record, the combination of a movable carriage for holding the source record in position to be sensed; record sensing means operable to sense a record column of the source record when positioned at a sensing station; normal record spacing means operable to move said carriage so that the record columns of the source record are positioned successively at the sensing station; recording means operable in response to the sensing of data-representing designations in the source record for recording such data in a sheet; release means operable, when activated, to move said carriage from an intermediate column sensing position to a terminal position and also operable to remove the source record from said carriage, and said release means comprising an electrically responsive device, mechanism movable from an inactive to an operated position by the energizing of said device, and said mechanism being operable when so moved to effect movement of said carriage to said terminal position, and means operated by said carriage upon reaching its said terminal position to restore said mechanism to its said inactive position; and means for activating said release means comprising means responsive to the advance of said carriage for energizing said electrically responsive device at a predetermined intermediate column sensing position of said carriage, and means operable by movement of said mechanism to its operated position for deenergizing said electrically responsive device.

9. In apparatus for recording data on a sheet under the control of data-representing designations contained in the record columns of a source record, the combination of a movable carriage for holding the source record in position to be sensed; record sensing means operable to sense a record column of the source record when positioned at a sensing station; normal record spacing means operable to move said carriage so that the record columns of the source record are positioned successively at the sensing station; recording means operable in response to the sensing of data-representing designations in the source record, for recording such data in a sheet; release means operable, when activated, to move said carriage from an intermediate column sensing position to a terminal position and also operable to remove the source record from said carriage, and said release means comprising an electrically responsive device, mechanism movable from an inactive to an operated position by the energizing of said device, and said mechanism being operable when so moved to effect movement of said carriage to said terminal position and means operated by said carriage upon reaching its said terminal position to restore said mechanism to its said inactive position; and means for activating said release means comprising a first control circuit including a relay coil and a control switch normally being in a first circuit condition and adjustable to a second circuit condition by movement of said mechanism to its operated position, and a second circuit including said electrically responsive device, a pair of normally open control contacts adjustable to closed position upon said carriage reaching a predetermined intermediate position, and a pair of relay contacts operated by said relay coil and occupying a closed position when said first circuit is in its said first circuit condition and movable to open position by said relay coil upon adjustment to said second circuit condition.

10. In apparatus for recording data on a sheet under the control of data-representing designations contained in the record columns of a source record, the combination of a movable carriage for holding the source record in position to be sensed; record sensing means operable to sense a record column of the source record when positioned at a sensing station; normal record spacing means operable to move said carriage so that the record columns of the source record are positioned successively at the sensing station; recording means operable in response to the sensing of data-representing designations in the source record, for recording such data in a sheet; multiple column spacing means effective, when activated, to move the record carriage from one of its column sensing positions to a second column position and comprising an electrically responsive device, mechanism movable from an inactive position to an operated position by the energizing of said device and said mechanism being operable when so moved to effect movement of said carriage to its said second column position, and means operated by said carriage upon reaching said second position to move said mechanism back to its said inactive position; and means for activating said multiple column spacing means when occupying its said one column position and comprising a first control circuit including a relay coil and a control switch normally being in a first circuit condition and adjustable to a second circuit condition by movement of said mechanism to its operated position, a second circuit including said electrically responsive device, a pair of normally open control contacts and a pair of relay contacts operated by said relay coil and occupying a closed position when said first circuit is in its said first circuit condition and movable to open position by said relay coil upon said first circuit being adjusted to said second circuit condition, and means effective when said carriage occupies said one column sensing position, for closing the control contacts in said second circuit.

11. In apparatus for recording data on a sheet under the control of designations representing both character and functional data and which are contained in the record columns of a source record, the combination of a movable carriage for holding the source record in position to be sensed; record sensing means operable to sense a record column of the source record when positioned at a sensing station; normal record spacing means operable to move said carriage so that the record columns of the source record are positioned successively at the sensing station; recording means operable in response to the sensing of data-representing designations in the source record, for recording such data in a sheet; multiple column spacing means effective, when activated, to move the record carriage from one of its column sensing positions to a second column position and comprising an electrically responsive device, mechanism movable from an inactive position to an operated position by the energizing of said device and said mechanism being operable when so moved to effect movement of said carriage to its said second column position, and means operated by said carriage upon reaching said second position to move said mechanism back to its said inactive position; and means responsive to the sensing of a significant designation in a predetermined record column of said source record, for activating said multiple column spacing means and comprising a first control circuit including a relay coil and a control switch normally being in a first circuit condition and adjustable to a second circuit condition by movement of said mechanism to its operated position, a second circuit including said electrically responsive device, a pair of normally open control contacts and, a pair of relay contacts operated by said relay coil and occupying a closed position when said first circuit is in its said first circuit condition and movable to open position by said relay coil upon said first circuit being adjusted to said second circuit condition, and means responsive to the sensing of said significant signal, for closing the control contacts in said second circuit.

12. In apparatus for recording data in a record tape under the control of data-representing designations contained in the record columns of a source record, the combination of source record sensing means for successively sensing the columns of said source record; column control means comprising contact elements corresponding, respectively, to the record columns of the source records and a circuit closing device operable to engage said contact elements synchronously with the sensing of corresponding record columns; tape punching mechanism comprising a plurality of code punching elements operable, respectively, to punch code holes in corresponding code positions of a record tape, a plurality of electrical relays corresponding, respectively, to the different data to be recorded and each being operable when energized to selectively operate the code punching elements singly and in combination so as to record in the tape the code designation which represents the datum corresponding to each such relay, electrical circuit means operable in response to the sensing of each designation in the source record for energizing the one of such relays which corresponds to the datum represented by the sensed designation; and pluggable circuit means for connecting, respectively, selected ones of said contact elements with selected ones of said relays and effective to energize such relays when said circuit closing device engages the connected contact elements so as to operate said punching mechanism to record in the tape the code designations representing the data corresponding to the connected relays.

13. In apparatus for recording data in a record tape under the control of data-representing designations contained in the record columns of a source record, the combination of a carriage for holding a source record in sensing position; record sensing and spacing means operable to advance the carriage with the record held thereby column-by-column past a sensing station and to sense each record column at such station; column control means comprising a plurality of spaced contact elements corresponding, respectively, to the record columns of the source records and a circuit closing device movable with said carriage so that for each column sensing position of said carriage the circuit closing device electrically engages the corresponding contact element; tape punching mechanism comprising a plurality of code punching elements operable, respectively, to punch code holes in corresponding code positions of a record tape, a plurality of electrical relays corresponding, respectively, to the different data to be recorded and each being operable when energized to selectively operate the code punching elements singly and in combination so as to record in the tape the code designation which represents the datum corresponding to each such relay; electrical circuit means operable in response to the sensing of each designation in the source record for energizing the one of such relays which corresponds to the datum represented by the sensed designation; and pluggable circuit means for connecting, respectively, selected ones of said contact elements with selected ones of said relays and effective to energize such relays when said circuit closing device engages the connected contact elements so as to operate said punching mechanism to record in the tape the code designations representing the data corresponding to the connected relays.

14. Apparatus for recording data in columns on a record sheet under the control of a source record, which source record has a series of columns thereon containing representations of data to be recorded in said sheet, such apparatus comprising record reading means adapted to sense a column of data representations on said source record, means for producing relative column-by-column movement between said source record and said reading means for causing the columns of said source record to be sensed successively, recording means including a plurality of code recording elements selectively operable for recording data-representing designations in a column of the record sheet, means for producing relative column-by-column movement between said sheet and said recording elements in timed relationship with the relative column-by-column movement of said source record and said reading means, a series of contact elements respectively corresponding to the columns of the source record, a circuit-closing device operable to engage said contact elements successively in timed relationship with the relative column-by-column movement of said source record and said reading means, translating means operable under the control of said reading means for operating said recording elements selectively to record in certain columns of said record sheet data-representing designations corresponding respectively to the data representations sensed in certain columns of said source record, and special control means for said recording means connected in circuit with said circuit-closing device and with certain of said contact elements for causing a predetermined data-representing designation to be recorded in said record sheet when a predetermined column of said source record is presented to said reading means.

15. In a system for reproducing records by first preparing a record tape under the control of original records and then utilizing such tape to control the production of secondary records containing at least some of the information contained in the original records, a machine controlled by the original records for recording in certain areas of the tape information derived from the original records and for recording in other areas of the tape timing code designations to define intervals wherein special functions other than the reproduction of information are performed by said machine and by the apparatus which utilizes the tape, said machine comprising record reading means including a first sensing portion which successively senses the items of information contained in each original record and a second sensing portion which senses the progress of said first sensing portion as it reads each record, recording means normally controlled by said first sensing portion for successively recording in the tape code designations respectively corresponding to the items of information sensed by said first sensing portion, and special control means for said recording means effective during intervals in which special functions are performed by said machine for causing timing code designations to be recorded in the tape during such intervals, said special control means including a first relay-operated portion controlled by said first sensing portion for causing said special control means to become effective in response to a predetermined special designation in an original record, and including also a second relay-operated portion controlled by said second sensing portion for causing said special control means to become effective when the sensing of an original record has progressed to a selected point.

16. In a system for reproducing records by first preparing a record tape under the control of original records and then utilizing such tape to control the production of secondary records containing at least some of the information contained in the original records, a machine controlled by the original records for recording in certain areas of the tape information derived from the original records and for recording in other areas of the tape timing code designations to define intervals wherein special functions other than the reproduction of information are performed by said machine and by the apparatus which utilizes the tape, said machine comprising record reading means for successively sensing the items of information contained in each original record, recording means including code recording elements selectively operable upon the tape for successively recording code designations therein, normally effective control means governed by said record reading means for operating said recording elements selectively to record in the tape information corresponding to that contained in the original record, normally ineffective control means operable when said normally effective control means is not operating to bring about a special function of said machine and concurrently therewith to operate said recording means for recording timing code designations in the tape while such special function is being performed, first relay means controlled by said reading means in response to the sensed information in the original records for operating said normally ineffective control means whenever a predetermined designation calling for said special function is sensed, and second relay means controlled by said reading means in response to the successive sensing actions thereof for operating said normally ineffective control means whenever the sensing of an original record has progressed to a selected point.

17. A machine for producing a record sheet bearing in certain areas thereof code designations corresponding respectively to data-representing designations arranged in columns on source records and bearing in other areas thereof timing code designations which do not correspond to the data in the source records, such machine comprising a carriage for holding a source record, carriage operating means normally effective to advance the carriage and the record held thereby column by column past a sensing station in the machine, sensing means for sensing the data columns of each source record as such record is advanced through the sensing station, code recording elements selectively operable to record code designations in the sheet, means for feeding the sheet relative to said code recording elements to space the code designations on the sheet, normally effective translating means responsive to the sensing of data-representing designations in the source record for selectively operating said recording elements to record in the sheet code designations corresponding to the sensed data-representing designations, normally ineffective control means operable for causing said machine to perform a special function whereby the column-by-column transfer of data from the source record to the sheet is suspended and said recording elements are operated to record timing code designations in the sheet, carriage position sensing means for sensing the columnar position of said carriage, first relay means responsive to said carriage position sensing means and governing said normally ineffective control means for causing the machine to perform said special function when said carriage reaches a selected position, and second relay means responsive to said record sensing means and controlling said recording elements for recording in the sheet a code designation indicative of said special machine function when a corresponding designation representing said function is sensed in the source record, said second relay means also governing said normally ineffective control means for causing the machine to perform said special function and for causing said recording elements to record timing code designations in the sheet following said special code designation.

18. A machine for producing a record sheet bearing in certain areas thereof code designations corresponding respectively to data-representing designations arranged in columns on source records and bearing in other areas thereof timing designations which do not correspond to the data in the source records, such machine comprising record sensing means for sensing a column of data-representing designations on a source record, means for feeding the source record column by column past said sensing means, code recording elements selectively operable upon the sheet for recording code designations therein, means normally effective to operate said recording elements under the control of said sensing means for recording in the sheet code designations which respectively represent the data in the sensed columns of the source record, special control means effective when operated to initiate a special function of the machine which suspends the normal operation of said recording elements under the control of said sensing means, said special control means including provisions for operating said recording elements selectively to record timing designations in the sheet while a special function is being performed by the machine, position sensing means for sensing the position of the source record relative to said sensing means and for emitting an electrical impulse when the source record attains a predetermined position, translating means under the control of said record sensing means for emitting an impulse when a designation calling for said special machine function is sensed in the source record, connecting means for operatively connecting said special control means to said position sensing means, and other connecting means for operatively connecting said special control means to said translating means, whereby timing designations are recerdod on the record sheet in response to the sensing of a predetermined data designation in the source record and also when the source record attains a predetermined position relative to said sensing means.

19. A machine for producing a record tape bearing in certain areas thereof code designations corresponding respectively to data-representing designations arranged in columns on record cards and bearing in other areas thereof timing designations which do not correspond to the data in the record cards, such machine comprising record sensing means for sensing a column of data on a record card, a carriage for holding said record card in position to be sensed by said sensing means, means for advancing said carriage to move the record card column-by-column past said sensing means, punching means for perforating the record tape according to a code for representing data therein, means for feeding the tape through said punching means, normally effective means responsive to said sensing means for operating said punching means to record in the record sheet code designations which represent data in sensed columns of the source record, a plurality of normally ineffective function-controlling devices each operative when rendered effective to initiate a special function of the machine suspending the normal operation of said recording elements under the control of said sensing means, normally ineffective punch control means operating when rendered effective to cause timing designations to be recorded serially in the tape by said punching means, column control means operated by said card carriage including a series of contacts respectively corresponding to the columns of the record card and a circuit-closing device successively engaging said contacts in timed relationship with the advance of said carriage, a plugboard having plughubs therein, with certain of said plughubs being respectively connected to said column-representing contacts whereby such plughubs are rendered active in succession as said circuit-closing device successively engages said contacts, translating means responsive to said sensing means for respectively activating other plughubs on said plugboard when predetermined designations calling for special functions of the machine are sensed in a record card, a plurality of electrical relay circuits each being operable to effect the operations of said punch controlling means and a particular one of said function-controlling devices for causing said machine to perform a special function and to record timing code designations in the tape as the special function is being performed, and selective connecting means for operatively connecting said relay circuits selectively to the plughubs on said plugboard whereby the operation of the machine is controlled automatically according to the sensed designations in the record cards and according to the columnar position of each record card as the same is being sensed.

20. In a system for reproducing perforated records by first preparing a record tape under the control of original record cards and then utilizing such tape to control the production of secondary record cards containing at least some of the information contained in the original record cards, a machine controlled by the original record cards for perforating in certain areas of the tape code designations representing data derived from the original record cards and perforating in other areas of the tape timing designations to define intervals wherein special functions other than the reproduction of information are performed by said machine and by the apparatus which utilizes the tape, said machine comprising record reading means for successively sensing the items of information contained in the columns of an original record card, punching means for perforating the record tape in accordance with a code to represent data therein, means for feeding the tape through said punching means to space the items of data recorded in the tape, normally effective means responsive to said reading means for operating said punching means to record in the tape code designations corresponding respectively to sensed data designations in the original record card, normally ineffective function-controlling means operative when rendered effective to initiate a special function of the machine which suspends the normal operation of said punching means under the control of said reading means, first punch control means operable to actuate said punching means for causing a special code designation to be recorded in the tape, second punch control means operable to actuate said punching means for serially recording timing designations in the tape, column sensing means having an electrical outlet for furnishing an electrical impulse when a predetermined column of the original record card is being sensed by said reading means, translating means controlled by said reading means and having an electrical outlet for furnishing an electrical impulse when a predetermined designation is sensed in the original record card, first relay means operatively connected to the outlet of said column sensing means and being effective when energized to operate said function-controlling means and said second punch control means, and second relay means operatively connected to the outlet of said translating means and effective when energized to operate said function-controlling means and said first and second punch controlling means in sequence, whereby a special function of the machine accompanied by the recording of timing designations in the tape takes place whenever a predetermined column of the original record card is sensed by said reading means and whenever a predetermined designation is sensed in the original record card, with an additional special designation being recorded in the tape when the special function is initiated in response to the sensing of said predetermined designation.

EDWARD J. RABENDA.

REFERENCES CITED

The following references are of record in the file of this patent:

UNITED STATES PATENTS

| Number | Name | Date |
|---|---|---|
| 2,157,040 | Von Pein | May 2, 1939 |
| 2,346,267 | Mills et al. | Apr. 11, 1944 |
| 2,346,268 | Mills et al. | Apr. 11, 1944 |
| 2,353,034 | Holt | July 4, 1944 |
| 2,355,297 | Holt | Aug. 8, 1944 |